United States Patent
Chheda et al.

(10) Patent No.: US 9,569,186 B2
(45) Date of Patent: Feb. 14, 2017

(54) ENERGY-FOCUSED RE-COMPILATION OF EXECUTABLES AND HARDWARE MECHANISMS BASED ON COMPILER-ARCHITECTURE INTERACTION AND COMPILER-INSERTED CONTROL

(71) Applicant: III Holdings 2, LLC, Wilmington, DE (US)

(72) Inventors: Saurabh Chheda, Santa Clara, CA (US); Kristopher Carver, Chicopee, MA (US); Raksit Ashok, Karnataka (IN)

(73) Assignee: III HOLDINGS 2, LLC, Wilmington, DE (US)

( * ) Notice: Subject to any disclaimer, the term of this patent is extended or adjusted under 35 U.S.C. 154(b) by 446 days.

(21) Appl. No.: 14/212,737

(22) Filed: Mar. 14, 2014

(65) Prior Publication Data
US 2014/0372994 A1    Dec. 18, 2014

Related U.S. Application Data

(63) Continuation of application No. 10/967,989, filed on Oct. 18, 2004, now abandoned.
(Continued)

(51) Int. Cl.
*G06F 9/45* (2006.01)
*G06F 9/30* (2006.01)

(52) U.S. Cl.
CPC ......... *G06F 8/4432* (2013.01); *G06F 9/30083* (2013.01); *Y02B 60/181* (2013.01)

(58) Field of Classification Search
None
See application file for complete search history.

(56) References Cited

U.S. PATENT DOCUMENTS 3,603,934 A    9/1971  Heath, Jr.
4,003,033 A    1/1977  O'Keefe
(Continued)

FOREIGN PATENT DOCUMENTS

EP    0552816 A2    7/1985
EP    0314277 A2    5/1989
(Continued)

OTHER PUBLICATIONS

Cohn et al., "Optimizing Alhpa Executables on Windows NT with Spike", 1997, Digital Technical Journal, vol. 9, No. 4, pp. 3-20.*
(Continued)

*Primary Examiner* — Chat Do
*Assistant Examiner* — Douglas Slachta
(74) *Attorney, Agent, or Firm* — Schwabe, Williamson & Wyatt

(57) ABSTRACT

A method comprising of analyzing and transforming a program executable at compile-time such that a processor design objective is optimized. A method including analyzing an executable to estimate energy consumption of an application component in a processor. A method including transforming an executable to reduce energy consumption in a processor. A processor framework controlled by compiler inserted control that statically exposes parallelism in an instruction sequence. A processor framework to reduce energy consumption in an instruction memory system with compiler inserted control.

20 Claims, 6 Drawing Sheets

Related U.S. Application Data

(60) Provisional application No. 60/515,260, filed on Oct. 29, 2003.

(56) References Cited

U.S. PATENT DOCUMENTS

| | | |
|---|---|---|
| 4,037,090 A | 7/1977 | Raymond, Jr. |
| 4,042,972 A | 8/1977 | Gruner |
| 4,050,058 A | 9/1977 | Garlic |
| 4,067,059 A | 1/1978 | Derchak |
| 4,079,455 A | 3/1978 | Ozga |
| 4,101,960 A | 7/1978 | Stokes |
| 4,110,822 A | 8/1978 | Porter |
| 4,125,871 A | 11/1978 | Martin |
| 4,128,873 A | 12/1978 | Lamiaux |
| 4,138,720 A | 2/1979 | Chu |
| 4,181,942 A | 1/1980 | Forster |
| 4,255,785 A | 3/1981 | Chamberlin |
| 4,354,228 A | 10/1982 | Moore |
| 4,376,977 A | 3/1983 | Bruinshorst |
| 4,382,279 A | 5/1983 | Ugon |
| 4,403,303 A | 9/1983 | Howes |
| 4,410,939 A | 10/1983 | Kawakami |
| 4,434,461 A | 2/1984 | Puhl |
| 4,435,758 A | 3/1984 | Lorie |
| 4,450,519 A | 5/1984 | Guttag |
| 4,463,421 A | 7/1984 | Laws |
| 4,538,239 A | 8/1985 | Magar |
| 4,541,045 A | 9/1985 | Kromer |
| 4,562,537 A | 12/1985 | Barnett |
| 4,577,282 A | 3/1986 | Caudel |
| 4,592,013 A | 5/1986 | Prame |
| 4,604,695 A | 8/1986 | Widen |
| 4,607,332 A | 8/1986 | Goldberg |
| 4,626,988 A | 12/1986 | George |
| 4,649,471 A | 3/1987 | Briggs |
| 4,665,495 A | 5/1987 | Thaden |
| 4,679,140 A | 7/1987 | Gotou |
| 4,709,329 A | 11/1987 | Hecker |
| 4,713,749 A | 12/1987 | Magar |
| 4,714,994 A | 12/1987 | Oklobdzija |
| 4,720,812 A | 1/1988 | Kao |
| 4,772,888 A | 9/1988 | Kimura |
| 4,773,038 A | 9/1988 | Hillis |
| 4,777,591 A | 10/1988 | Chang |
| 4,787,032 A | 11/1988 | Culley |
| 4,803,621 A | 2/1989 | Kelly |
| 4,860,198 A | 8/1989 | Takenaka |
| 4,870,562 A | 9/1989 | Kimoto |
| 4,873,626 A | 10/1989 | Gifford |
| 4,931,986 A | 6/1990 | Daniel |
| 4,992,933 A | 2/1991 | Taylor |
| 5,021,993 A | 6/1991 | Matoba |
| 5,036,460 A | 7/1991 | Takahira |
| 5,038,282 A | 8/1991 | Gilbert |
| 5,045,995 A | 9/1991 | Levinthal |
| 5,070,451 A | 12/1991 | Moore |
| 5,111,389 A | 5/1992 | McAuliffe |
| 5,121,498 A | 6/1992 | Gilbert |
| 5,127,091 A | 6/1992 | Boufarah |
| 5,132,575 A * | 7/1992 | Chern ............... G11C 11/4091 326/57 |
| 5,136,697 A | 8/1992 | Johnson |
| 5,193,202 A | 3/1993 | Jackson |
| 5,224,214 A | 6/1993 | Rosich |
| 5,230,079 A | 7/1993 | Grondalski |
| 5,276,895 A | 1/1994 | Grondalski |
| 5,361,367 A | 11/1994 | Fijany |
| 5,410,669 A | 4/1995 | Biggs |
| 5,430,854 A | 7/1995 | Sprague |
| 5,479,624 A | 12/1995 | Lee |
| 5,481,684 A | 1/1996 | Richter |
| 5,481,693 A | 1/1996 | Blomgren |
| 5,497,478 A | 3/1996 | Murata |
| 5,524,223 A | 6/1996 | Lazaravich |
| 5,542,059 A | 7/1996 | Blomgren |
| 5,542,074 A | 7/1996 | Kim |
| 5,551,039 A | 8/1996 | Weinberg |
| 5,555,386 A | 9/1996 | Nomura |
| 5,555,428 A | 9/1996 | Radigan |
| 5,560,028 A | 9/1996 | Sachs |
| 5,579,520 A | 11/1996 | Bennett |
| 5,590,283 A | 12/1996 | Hillis |
| 5,590,356 A | 12/1996 | Gilbert |
| 5,598,546 A | 1/1997 | Blomgren |
| 5,604,913 A | 2/1997 | Koyanagi |
| 5,608,886 A | 3/1997 | Blomgren |
| 5,630,143 A | 5/1997 | Maher |
| 5,637,932 A | 6/1997 | Koreeda |
| 5,638,525 A | 6/1997 | Hammond |
| 5,638,533 A | 6/1997 | Law |
| 5,652,894 A | 7/1997 | Hu |
| 5,655,122 A | 8/1997 | Wu |
| 5,655,124 A | 8/1997 | Lin |
| 5,659,722 A | 8/1997 | Blaner |
| 5,659,778 A | 8/1997 | Gingold |
| 5,664,950 A | 9/1997 | Lawrence |
| 5,666,519 A | 9/1997 | Hayden |
| 5,684,973 A | 11/1997 | Sullivan |
| 5,696,958 A | 12/1997 | Mowry |
| 5,704,053 A | 12/1997 | Santhanam |
| 5,721,893 A | 2/1998 | Holler |
| 5,727,229 A | 3/1998 | Kan |
| 5,737,572 A | 4/1998 | Nunziata |
| 5,737,749 A | 4/1998 | Patel |
| 5,742,804 A | 4/1998 | Yeh |
| 5,752,068 A | 5/1998 | Gilbert |
| 5,758,112 A | 5/1998 | Yeager |
| 5,758,176 A | 5/1998 | Agarwal |
| 5,774,685 A | 6/1998 | Dubey |
| 5,774,686 A | 6/1998 | Hammond |
| 5,778,241 A | 7/1998 | Bindloss |
| 5,781,750 A | 7/1998 | Blomgren |
| 5,790,877 A * | 8/1998 | Nishiyama ............... G06F 1/08 712/E9.032 |
| 5,794,062 A | 8/1998 | Baxter |
| 5,805,907 A | 9/1998 | Loper |
| 5,805,915 A | 9/1998 | Wilkinson |
| 5,812,811 A * | 9/1998 | Dubey ............... G06F 9/3009 712/200 |
| 5,822,606 A | 10/1998 | Morton |
| 5,848,290 A | 12/1998 | Yoshida |
| 5,854,934 A * | 12/1998 | Hsu ............... G06F 8/4442 711/118 |
| 5,857,104 A * | 1/1999 | Natarjan ............... G06F 8/4451 712/239 |
| 5,864,697 A | 1/1999 | Shiell |
| 5,864,707 A | 1/1999 | Tran |
| 5,870,581 A | 2/1999 | Redford |
| 5,872,987 A | 2/1999 | Wade |
| 5,875,324 A | 2/1999 | Tran |
| 5,875,464 A | 2/1999 | Kirk |
| 5,884,057 A | 3/1999 | Blomgren |
| 5,887,166 A | 3/1999 | Mallick |
| 5,903,750 A | 5/1999 | Yeh |
| 5,930,490 A | 7/1999 | Bartkowiak |
| 5,930,509 A | 7/1999 | Yates |
| 5,933,650 A | 8/1999 | van Hook |
| 5,933,860 A | 8/1999 | Emer |
| 5,946,222 A | 8/1999 | Redford |
| 5,949,995 A | 9/1999 | Freeman |
| 5,960,467 A | 9/1999 | Mahalingaiah |
| 5,966,544 A | 10/1999 | Sager |
| 5,991,857 A | 11/1999 | Koetje |
| 5,991,884 A * | 11/1999 | Lin ............... G06F 1/32 712/204 |
| 5,996,061 A | 11/1999 | Lopez-Aguado |
| 6,006,328 A | 12/1999 | Drake |
| 6,021,484 A | 2/2000 | Park |
| 6,044,469 A | 3/2000 | Horstmann |
| 6,049,330 A | 4/2000 | Redford |
| 6,052,703 A | 4/2000 | Redford |
| 6,058,469 A | 5/2000 | Baxter |
| 6,067,609 A | 5/2000 | Meeker |

(56) References Cited

U.S. PATENT DOCUMENTS

| | | | |
|---|---|---|---|
| 6,067,622 A | 5/2000 | Moore |
| 6,076,158 A | 6/2000 | Sites |
| 6,078,745 A | 6/2000 | De Greef |
| 6,089,460 A | 7/2000 | Hazama |
| 6,105,139 A | 8/2000 | Dey |
| 6,108,775 A | 8/2000 | Shiell |
| 6,119,205 A | 9/2000 | Wicki |
| 6,121,905 A | 9/2000 | Redford |
| 6,130,631 A | 10/2000 | Redford |
| 6,175,892 B1 | 1/2001 | Sazzad |
| 6,178,498 B1 | 1/2001 | Sharangpani |
| 6,211,864 B1 | 4/2001 | Redford |
| 6,212,542 B1 | 4/2001 | Kahle |
| 6,216,223 B1 | 4/2001 | Revilla |
| 6,219,796 B1 | 4/2001 | Bartley |
| 6,256,743 B1 | 7/2001 | Lin |
| 6,272,512 B1 | 8/2001 | Golliver |
| 6,272,676 B1 | 8/2001 | Haghighat |
| 6,282,623 B1 | 8/2001 | Halahmi |
| 6,282,628 B1 | 8/2001 | Dubey |
| 6,282,639 B1 | 8/2001 | Puziol |
| 6,286,135 B1 | 9/2001 | Santhanam |
| 6,289,505 B1 | 9/2001 | Goebel |
| 6,292,879 B1 | 9/2001 | Fong |
| 6,301,705 B1 | 10/2001 | Doshi |
| 6,327,661 B1 | 12/2001 | Kocher |
| 6,334,175 B1 | 12/2001 | Chih |
| 6,341,371 B1 * | 1/2002 | Tandri ................. G06F 8/452 712/200 |
| 6,381,668 B1 | 4/2002 | Lunteren |
| 6,385,720 B1 | 5/2002 | Tanaka |
| 6,393,520 B2 | 5/2002 | Yoshikawa |
| 6,404,439 B1 | 6/2002 | Coulombe |
| 6,412,105 B1 | 6/2002 | Maslennikov |
| 6,430,674 B1 | 8/2002 | Trivedi |
| 6,430,693 B2 | 8/2002 | Lin |
| 6,446,181 B1 | 9/2002 | Ramagopal |
| 6,452,864 B1 | 9/2002 | Condemi |
| 6,473,339 B2 | 10/2002 | De Ambroggi |
| 6,477,946 B1 | 11/2002 | Ogata |
| 6,487,640 B1 | 11/2002 | Lipasti |
| 6,487,651 B1 | 11/2002 | Jackson |
| 6,502,188 B1 | 12/2002 | Zuraski, Jr. |
| 6,529,943 B1 | 3/2003 | Ohi |
| 6,539,543 B1 | 3/2003 | Guffens |
| 6,550,004 B1 | 4/2003 | Henry |
| 6,560,776 B1 | 5/2003 | Breggin |
| 6,571,331 B2 | 5/2003 | Henry |
| 6,574,740 B1 | 6/2003 | Odaohhara |
| 6,601,161 B2 | 7/2003 | Rappoport |
| 6,611,910 B2 | 8/2003 | Sharangpani |
| 6,625,740 B1 | 9/2003 | Datar |
| 6,643,739 B2 | 11/2003 | Van De Waerdt |
| 6,658,578 B1 | 12/2003 | Laurenti |
| 6,671,798 B1 | 12/2003 | Puziol |
| 6,675,305 B1 | 1/2004 | Mohammad |
| 6,687,838 B2 | 2/2004 | Orenstien |
| 6,732,253 B1 | 5/2004 | Redford |
| 6,772,323 B2 | 8/2004 | Krishnan |
| 6,795,781 B2 | 9/2004 | Aldridge |
| 6,813,693 B2 | 11/2004 | Chilimbi |
| 6,826,652 B1 | 11/2004 | Chauvel |
| 6,931,518 B1 | 8/2005 | Redford |
| 6,934,865 B2 * | 8/2005 | Moritz ................ G06F 1/3203 713/320 |
| 6,970,985 B2 | 11/2005 | Moritz |
| 6,988,183 B1 | 1/2006 | Wong |
| 7,024,393 B1 | 4/2006 | Peinado |
| 7,036,118 B1 | 4/2006 | Ulery |
| 7,076,638 B2 | 7/2006 | Heishi |
| 7,080,366 B2 | 7/2006 | Kramskoy |
| 7,089,594 B2 | 8/2006 | Lal |
| 7,162,617 B2 | 1/2007 | Ota |
| 7,185,215 B2 | 2/2007 | Cook |
| 7,278,136 B2 | 10/2007 | Moritz |
| 7,299,500 B1 | 11/2007 | Klebe |
| 7,430,670 B1 | 9/2008 | Horning |
| 7,467,377 B2 | 12/2008 | Wu |
| 7,487,340 B2 | 2/2009 | Luick |
| 7,493,607 B2 | 2/2009 | Moritz |
| 7,564,345 B2 | 7/2009 | Devadas |
| 7,600,265 B2 | 10/2009 | Davydov |
| 7,613,921 B2 | 11/2009 | Scaralata |
| 7,639,805 B2 | 12/2009 | Li |
| 7,676,661 B1 | 3/2010 | Mohan |
| 2001/0032309 A1 | 10/2001 | Henry |
| 2001/0037450 A1 | 11/2001 | Metlitski |
| 2001/0044891 A1 | 11/2001 | McGrath |
| 2001/0056531 A1 | 12/2001 | McFarling |
| 2002/0073301 A1 | 6/2002 | Kahle |
| 2002/0095566 A1 | 7/2002 | Sharangpani |
| 2002/0104077 A1 | 8/2002 | Charnell |
| 2002/0116578 A1 | 8/2002 | Sakai |
| 2003/0014742 A1 | 1/2003 | Seth |
| 2003/0041230 A1 | 2/2003 | Rappoport |
| 2003/0066061 A1 | 4/2003 | Wu |
| 2004/0010679 A1 | 1/2004 | Moritz |
| 2004/0010782 A1 | 1/2004 | Moritz |
| 2004/0010783 A1 | 1/2004 | Moritz |
| 2004/0015923 A1 | 1/2004 | Hemsing |
| 2004/0139340 A1 | 7/2004 | Johnson |
| 2004/0154011 A1 * | 8/2004 | Wang ................ G06F 9/3009 717/158 |
| 2004/0158691 A1 | 8/2004 | Redford |
| 2004/0162964 A1 | 8/2004 | Ota |
| 2004/0205740 A1 | 10/2004 | Lavery |
| 2005/0055678 A1 | 3/2005 | Sakai |
| 2005/0066153 A1 | 3/2005 | Sharangpani |
| 2005/0108507 A1 | 5/2005 | Chheda |
| 2005/0114850 A1 | 5/2005 | Chheda |
| 2005/0154867 A1 | 7/2005 | DeWitt, Jr. |
| 2005/0172277 A1 | 8/2005 | Chheda |
| 2005/0210249 A1 | 9/2005 | Lee |
| 2005/0262332 A1 | 11/2005 | Rappoport |
| 2006/0179329 A1 | 8/2006 | Terechko |
| 2007/0294181 A1 | 12/2007 | Chheda |
| 2008/0126766 A1 | 5/2008 | Chheda |
| 2009/0300590 A1 | 12/2009 | Moritz |
| 2014/0372994 A1 | 12/2014 | Chheda |

FOREIGN PATENT DOCUMENTS

| | | |
|---|---|---|
| EP | 0679991 A1 | 11/1995 |
| EP | 0681236 A1 | 11/1995 |
| EP | 0945783 A2 | 9/1999 |
| GB | 2201015 A | 8/1988 |
| JP | 10-289305 | 10/1998 |
| JP | 2002-007359 | 1/2002 |
| WO | 87/00318 A1 | 1/1987 |
| WO | 91/19269 A1 | 12/1991 |
| WO | 93/04438 A1 | 3/1993 |
| WO | 99/14685 A1 | 3/1999 |
| WO | 02/39271 A1 | 5/2002 |
| WO | 02/39272 A1 | 5/2002 |
| WO | 02/44895 A1 | 6/2002 |
| WO | 02/46885 A2 | 6/2002 |
| WO | 2004/006060 A2 | 1/2004 |

OTHER PUBLICATIONS

Bellas et al. "Architectural and Compiler Techniques for Energy Reduction in High-Performance Microprocessors", 2000, IEEE Transactions on Very Large Scale Integration Systems, vol. 8 No. 3, pp. 317-326.*

Kim et al., "Predictive Precharging for Bitline Leakage Energy Reduction", 2002, 15th Annual IEEE International ASIC/SOC Conference.*

Unnikrishnan et al., "DynamicCompilation for Energy Adaption", 2002, IEEE/ACM International Conference on Computer Aided Design.*

(56) References Cited

OTHER PUBLICATIONS

Muller et al., Predicting Instruction Cache Behavior, Jun. 1994, ACM SIGPLAN Workshop on Language, Compiler and Tool SUpport for Real-Time Systems.*
Kim et al., "Partitioned Instruction Cache Architecture for Energy Efficiency", May 2003, ACM Transactions on Embedded Computing Systems, vol. 2, No. 2 pp. 163-185.*
Abraham et al., "Automatic and Efficient Evaluation of Memory Hierarchies for Embedded Systems"; Micro; p. 114, 32nd Annual IEEE/ACM International Symposium on Microarchitecture (MICRO'99); 1999.
Abstract Search "SIMD Processor" dated Mar. 21, 2003 (484 pages).
Actel Corporation; "Design Security in Nonvolatile Flash and Antifuse AFPGAs Security Backgrounder" [online] retrieved from the Internet: URL <http://www.actel.com/documents/DesignSecurity_WP.pdf> [retrieved on Feb. 22, 2011] (2002).
Advanced Micro Devices, Inc., "Quantispeed Architecture"; AMD White Paper, Sunnyvale, CA (2001).
Aho et al., "Compilers: Principles, Techniques and Tools"; Addison-Wesley, Reading, MA; 1988.
Akkar et al., "An Implementation of DES and AES, Secure Against Some Attacks"; CHES2001, LNCS 2162; pp. 309-318 (2001).
Albonesi et al., "Selective Cache Ways: On-Demand Cache Resource Allocation"; Proceedings of the 32nd International Symposium on Microarchitecture; pp. 248-259 (Nov. 1999).
Al-Tawil, K. et al., "Performance Modeling and Evaluation of MPI"; Journal of Parallel and Distributed Computing, vol. 61; pp. 202-223, 2001.
Amme et al., "Data Dependence Analysis of Assembly Code"; International Journal on Parallel Programming 28, 5; 2000.
Anderson et al., "Physical Design of a Fourth-Generation Power GHz Microprocessor"; Digest of Technical Papers, IEEE Int'l Solid State Circuit Conf.; pp. 232-233 and 451 (2001).
Anderson, L. "Program Analysis and Specialization for the C Programming Language"; PhD. Thesis, DIKU, Univ. of Copenhagen (May 1994).
ANSI x9.17; "American National Standard for Financial Institution Key Management (wholesale)"; Tech. Rep., American Bankers Assoc. (1985).
Antoniou, A.; "Digital Filters: Analysis, Design & Applications"; McGraw-Hill, New York, NY (1993).
Aragon, et al., "Power-aware Control Speculation Through Selective Throttling"; Proceedings of 9th International Symposium on High Performance Computer Architecture (HPCA); 2003.
ARM Architecture Reference Manual—ARM DD1 0100E; pp. A4-28 and A4-82 ( © 1996-2000).
Ashok et al., "Cool-Mem: A Compiler-Enabled Power-Aware General Purpose Memory System"; UMASS Technical Report TR-CSE-01-03' Nov. 2001.
Ashok et al., "Cool-Mem: Combining Statically Speculative Memory Accessing with Selective Address Translation for Energy Efficiency"; in Proceedings of the 10th international conference on Architectural Support for Programming Language and Operating Systems (ASPLOS 2002); pp. 133-143, San Jose, CA; Oct. 2002.
Ashok et al., "Coupling Compiler-Enabled and Conventional Memory Accessing for Energy Efficiency"; ACM Transactions on Computer Systems (TOCS), vol. 22, No. 2; pp. 180-213-May 2004.
Ashok et al., "Network Software: From NCP to Ubiquitous Computing"; Encyclopedia of Life Support Systems; 2001.
Athanas et al., "Processor Reconfiguration Through Instruction-Set Metamorphosis"; IEEE/Computer Magazine, v.26(3), pp. 11-18 (1993).
Babb et al., "Parallelizing Applications into Silicon"; The 7th Annual IEEE Symposium on field-Programmable Custom Computing Machines, FCCM '99, Napa, CA; Apr. 1999.
Bahar et al., "Power and Energy Reduction Via Pipeline Balancing"; IEEE, 12 pages; 2001.
Banerjee et al., "Fast execution of loops with IF statements"; IEEE vol. 84, pp. 126-132; 1984.

Baniasadi et al., "Instruction Flow-Based Front-end Throttling for Power-Aware High-Performance Processors"; (ISLPED '01); ACM; pp. 16-21; 2001.
Bechade et al., "A 32b 66MHz 1.8W Microprocessor"; Digest of Technical Papers; IEEE; pp. 208-209; 1994.
Bellas et al., "Architectural and Computer Techniques for Energy Reduction in High-Performance Microprocessors"; 2000, IEEE Transactions on Very Large Scale Integration Systems, vol. 8, No. 3; pp. 317-326.
Bellas et al., "Using Dynamic Cache Management Technique to Reduce Energy in General Purpose Processors"; pp. 693-708; 2000.
Ben Naser et al., "A Step-by-Step Design and Analysis of Low Power Caches for Embedded Processors"; Boston Area Architecture Workshop (BARC-2005); Jan. 2005.
Ben Naser et al., "Data Memory Subsystem Resilient to Process Variations"; PhD. Thesis; Jan. 2008.
Ben Naser, M., "Designing Memory Subsystems Resilient to Process Variations"; IEEE Computer Society Annual Symposium on VLSI (ISVLSI 2007) Brazil; May 2007.
Ben Naser, M., "Power and Failure Analysis of Cam Cells Due to Process Variations"; Proc. of 13th IEEE International Conference on Electronics, Circuits and Systems (IECS'06); Nice, France; Dec. 2006.
Benini, et al., "A Recursive Algorithm for Low-Power Memory Partitioning"; (ISLPED'00), ACM; pp. 78-83; 2000.
Biham et al., "Differential Cryptanalysis of DES-like Cryptosystems"; J. Cryptology vol. 4, pp. 3-72; 1991.
Brooks et al., "Wattch: A Framework for Architecture-Level Power Analysis and Optimizations"; Proceedings of the 27th International Symposium on Computer Architecture (ISCA '00); ACM pp. 83-94; 2000.
Burger et al., "The SimpleScalar Tool Set, Version 2.0"; Computer Sciences Dept. Univ. of Wisconsin-Madison, Technical Report 1342; pp. 13-25; 1997.
Bursky, D., "Advanced DRAM Architecture Overcome Data Bandwidth Limits"; Electron. Des., vol. 45; pp. 73-88; 1997.
Burtscher et al., "Static Load Classification for Improving the Value Predictability of Data-Cache Misses"; ACM; pp. 222-233; 2000.
Buyuktosunoglu et al., "An Adaptive Issue Queue for Reduced Power at High Performance"; Power-Aware Computer Systems, First International Workshop, PACS 2000; pp. 25-39; 2000.
Calder et al., "Fast & Accurate Instruction Fetch and Branch Prediction"; IEEE; pp. 2-11; 1994.
Calder et al., "Next Cache Line and Set Prediction"; Proceedings of the 1995 International Computer Symposium on Computer Architecture, ACM; pp. 287-296; 1995.
Cantin et al., "Cache Performance for Selected SPEC CPU2000 Benchmarks"; Computer Architecture News, 29(4): 13-18; 2001.
Chang et al., "Protecting Software Code by Guards"; Proc. ACM Workshop on Security and Privacy in Digital Rights Management (SPDRM); LNCS 2320; pp. 160-175; 2002.
Chase et al., "Lightweight Shares Object in a 64-Bit Operating System"; Univ. of Washington, Dept. of Computer Science & Engineering, Technical Report 92-03-09; Seattle, WA (Jun. 1992).
Chheda et al., "Combining Compiler and Runtime IPC Predictions to Reduce Energy in Next Generation Architecture"; Proceedings of the First Conference on Computing Frontiers; pp. 240-0254; Italy; Apr. 2004.
Chheda et al., "Memory Systems: Overview and Trends"; Encyclopedia of Life Support Systems; 2001.
Chiou et al., "Application-Specific Memory Management for Embedded Systems Using Software-Controlled Caches"; (DAC'00), ACM; pp. 416-419; 2000.
Cohn et al., "Optimizing Alpha Executables on Windows NT with Spike"; 1997, Digital Technical Journal, vol. 9, No. 4; pp. 3-20.
Collins, L., "Power Drops Focus the Minds at ARM"; EE Times (2002) [online] Retrieved from the Internet: <URL: http://eetimes.eu/uk/16505609> [retrieved on Aug. 28, 2008].
Compaq Computer Corporation, "Compiler Writer's Guide for the Alpha 21264"; Digital Equipment Corporation © 1999.
Cooper et a., "Compiler-Controlled Memory"; ASPLOS VIII; ACM, 33(11):2-11; 1998.

(56) References Cited

OTHER PUBLICATIONS

Cortadella et al., "Evaluation of A+B=K Conditions Without Carry Propagation"; IEEE Trans. on Computers vol. 41(11); pp. 1484-1488; Nov. 1992.

Cosoroba, A., "Double Data Rate Synchronous DRAMS in High Performance Applications"; WESCON'97 IEEE Conference Proceedings; pp. 387-391; 1997.

Cowell et al., "Improved Modeling and Data-Migration for Dynamic Non-Uniform Cache Access"; In WDD2 2003 organized in conjunction with ISCA 2003.

Daemen et al., "The Rijndael Block Cipher—AES Proposal" [online] Tech. Rep.; Mar. 9, 1999 [retrieved on Apr. 1, 2008] Retrieved from the Internet: <URL:http://csrc.nist.gov/encryption/aes/round2/r2algs.htm>.

Deitrich et al., "Speculative Hedge: Regulating Compile-Time Speculation Against Profile Variations"; IEEE; pp. 70-79; 1996.

Delaluz et al., "Energy-Oriented Compiler Optimizations for Partitioned Memory Architectures"; International Conference on Compiler, Architecture and Synthesis for Embedded Systems, Proceedings of the 2000 International Conference on Compilers, Architecture and Synthesis for Embedded Systems; San Jose, CA; 10 pages; 2000.

Desmet et al., "Improved Static Branch Prediction for Weak Dynamic Predictions"; Retrieved from the Internet: <URL:http://escher.elis.urgent.be/publ/Edocs/DOC/P103_085.pdf> pp. 1-3 (Sep. 2003).

Folegnani et al., "Energy-Effective Issue Logic"; IEEE; 10 pages; 2001.

Frank et al., "SUDS: Primitive Mechanisms for Memory Dependence Speculation"; Technical Report LCS-TM-591; Oct. 1998.

Furber et al., "ARM3-32B RISC Processor with 4 Kbyte On-Chip Cache"; VLSI'89; Elsevier; pp. 35-44; 1989.

Furber et al., "Power Saving Feature in AMULET2e"; In Power Driven Microarchitecture Workshop at 25th Annual International Symposium on Computer Architecture; Barcelona, Space; 4 pages; Jun. 1998.

Gandolfi et al., "Electromagnetic Analysis: Concrete Results"; Workshop of Cryptographic Hardware and Embedded Systems (CHES'01), LNCS 2162; pp. 251-261; 2001.

Gassend et al., "Control Physical Random Functions"; Proc. 18th Ann. Computer Security Applications Conf. [online] Retrieved from the Internet: <URL: http://csb.csail.mit.edu/pubs/memo/Memo-457/memo-457.pdf> [retrieved on Feb. 22, 2011] (2002).

Ghiasi et al., "Using IPC Variation in Workloads with Externally Specified Rates to Reduce Power Consumption"; In Workshop on Complexity Effective Design; Vancouver, Canada; pp. 1-10; Jun. 2000.

Gilmont et al., "An architecture of Security Management Unit for Safe Hosting of Multiple Agents"; Proc. of the Int'l Workshop on Intelligent Communications and Multimedia Terminals [online] Retrieved from the Internet: <URL:http://citeseerx.ist.psu.edu/viewdoc/download?doi=10.1.1.140.634&rep=rep1&type=pdf> [retrieved on Feb. 22, 2011] [Nov. 1998].

Gilmont et al., "Hardware Security for Software Privacy Support"; Electronics Lett., vol. 35(24); pp. 296-2097 (1999).

Gowan et al., "Power Considerations in the Design of the Alpha 21264 Microprocessor"; (DAC 98); ACM; pp. 726-731; 1998.

Grand, J.; "Attacks on and Countermeasures for USB Hardware Token Devices"; Proc. Fifth Nordic Workshop on Secure IT Systems [online] Retrieved from the Internet: <URL:http://citeseerx.ist.psu.edu/viewdoc/download;jsessionid=98145A989F0A335F16702C1EA12F0819?doi=10.1.1.16.540&rep=rep1&type=pdf> [retrieved on Feb. 22, 2011] (2002).

Grant et al., "Annotation-Directed Run-Time Specialization in C"; ACM; pp. 163-178; 1997.

Guo et al., "Compiler-Enabled Cache Management for Pointer-Intensive Programs"; Boston Area Architecture Workshop (BARC-2003); Jan. 2003.

Guo et al., "Energy Characterization of Hardware-Based Data Prefetching"; Proc. of the IEEE Int'l Conference on Computer Design (ICCD'04); pp. 518-523; Oct. 2004.

Guo et al., "Energy-Aware Data Prefetching for General-Purpose Programs"; Proc. of PACS'04 Workshop on Power-Aware Computer Systems, Micro-37; Lecture Notes in Computer Science; Dec. 2004.

Guo et al., "PARE: A Power-Aware Data Prefetching Engine"; Proc. of International Symposium on Low Power Electronics and Design (ISLPED'05); San Diego, CA; Aug. 2005.

Guo et al., "Runtime Biased Pointer Analysis and Its Application on Energy Efficiency"; Proc. of Workshop on Power-Aware Computer Systems (PACS'03); Micro-36; Dec. 2003; San Diego, CA; also in Lecture Notes in Computer Science, vol. 3164; pp. 1-12; Springer 2004; ISBN 3-540-24031-4.

Guo et al., "Synchronization Coherence: A Transparent Hardware Mechanism for Cache Coherence and Fine-Grained Synchronization"; accepted by Journal of Parallel and Distributed Computing; JPDS; 2007.

Guo, Y., "Compiler-Assisted Hardware-Based Data Prefetching for Next Generation Processors"; PhD Thesis; May 2007.

Gutmann, P., "Data Remanence in Semiconductor Devices"; Proc. of the 10th USENIX Security Symposium; 17 pages (2001).

Gutmann, P., "Secure Deletion of Data from Magnetic and Solid-State Memory"; Proc. of the 6th USENIX Security Symposium; 18 pages (1996).

Harvard University/Michael D. Smith's Research Group on Compilation and computer Architecture; [online] Retrieved from the Internet: <URL:http://www.eecs.harvard.edu/hube/software/software.html> [retrieved on May 4, 2004].

Heinrich, J., MIPS R 10000 Microprocessor User Manual, 2nd Ed., MIPS Technologies, Inc.; 1996.

Heinrich, J., MIPS R 4000 Microprocessor User's Manual, 2nd Ed., MIPS Technologies, Inc.; 1994.

Hennessey et al., "Enhancing Vector Performance"; Computer Architecture, a Qualitative Approach, Second Edition, Section 5; pp. B23-B29 (1996).

Henry et al., "Circuits for Wide-Window SuperScaler Processors"; (ISCA'00); ACM; pp. 236-247; 2000.

Hinton et al., "The Microarchitecture of the Pentium 4 Processor"; Intel Technology Journal Q1; pp. 1-12; 2001.

Huang et al., "L1 Data Cache Decomposition for Energy Efficiency"; (ISLPED'01); ACM; pp. 10-15; 2001.

Huang et al., "Speculative Disambiguation: A Compilation Technique for Dynamic Memory Disambiguation"; IEEE; pp. 200-201; 1994.

IBM, "Single-Bit Processor Enable Scheme", IBM Technical Disclosure Bulletin, vol. 29, No. 11; pp. 5016-5017 (Apr. 1987).

Inoue et al., "Way-Predicting Set-Associative Cache for High Performance and Low energy Consumption"; (ISLPED'99); ACM; pp. 273-275; 1999.

Intel 80386 Programmer's Reference Manual (1986).

Intel, "Intel StrongARM SA-1110 Microprocessor"; SA-1110 Brief Datasheet; pp. 1-9; 2000.

International Preliminary Report on Patentability for Application PCT/US2003/021076; mailed Sep. 10, 2004.

International Search Report for Application No. PCT/US2003/020999; dated Oct. 10, 2003.

International Search Report for Application No. PCT/US2003/021120; dated Jul. 30, 2004.

Itoh et al., "DPA Countermeasure Based on 'Masking Method'"; ICICS 2001, LNCS 2288; pp. 440-456; 2002.

Jain et al., "A 1.2Ghz Alpha Microprocessor with 44.8GB/s Chip Pin Bandwidth"; IEEE; pp. 240-241; 2001.

Kaxiras et al., "Cache Decay: Exploiting Generational Behavior to Reduce Cache Leakage Power"; IEEE; pp. 240-251; 2001.

Kean, T.; "Secure Configuration of Field-Programmable Gate Arrays"; Proc. of the 11th Int'l Conf. on Field-Programmable Logic and Applications [online] Retrieved from the Internet: <URL:http://citeseerx.ist.psu.edu/viewdoc/download?doi=10.1.186.2017&rep=rep1&type=pdf> [retrieved on Feb. 22, 2011] (2001).

Kelsey et al., "Side Channel Cryptanalysis of Product Ciphers"; Proc. ESORICS'98; pp. 97-110; (1998).

(56) References Cited

OTHER PUBLICATIONS

Kever et al., "A 200MHz RISC Microprocessor with 128kB On-Chip Caches"; IEEE; pp. 410, 411 and 495; 1997.
Kim et al., "Partitioned Instruction Cache Architecture for Energy Efficiency" May 2003; ACM Transactions on Embedded Computing Systems; vol. 2, No. 2; pp. 163-185.
Kim et al., "Predictive Precharging for Bitline Leakage Energy Reduction"; 2002, 15th Annual IEEE International ASIC/SOC Conference; pp. 36-40.
Kin et al., "The Filter Cache: An Energy Efficient Memory Structure"; IEEE; pp. 184-193; 1997.
Kocher et al., "Differential Power Analysis"; CRYPTO'99, INCS 1666; 10 pages (1999).
Kocher et al., "Timing Attaches on Implementations of Diffie-Hellmann; RSA, DSS and Other Systems"; Adv. In Cryptology (CRYPTO'96); 10 pages (1996).
Kommerling et al., "Design Principles for Tamper-Resistant Smartcard Processors"; USENIX Workshop on Smartcard Technology; 12 pages (1999).
Kowalczyk et al., "First-Generation MAJC Dual Processor"; IEEE; pp. 236-237 and 451; 2001.
Kuhn et al., "Tamper Resistance—A Cautionary Note"; Proc. of the 2nd USENIX Workshop on Electronics Commerce; 11 pages (1996).
Kuhn et al.; "Soft Tempest: Hidden Data Transmission Using Electromagnetic Emanations"; Proc. of 2nd Int'l Workshop on Information Hiding [online] Retrieved from the Internet: <URL: http://www.cl.cam.ac.uk/~mgk25/ih98-tempest.pdf> [retrieved on Feb. 22, 2011] (1998).
Kuhn, M.; "Optical Time-Domain Eavesdropping Risks of CRT Displays"; Proc. of the 2002 IEEE Symp. on Security and Privacy [online] Retrieved from the Internet: <URL: http://www.cl.cam.ac.uk/~mgk25/ih98/tempest.pdf> [retrieved on Feb. 22, 2011] (1998).
Kulkarni et al., "Advanced Data Layout Optimization for Multimedia Applications"; Lecture Notes in Computer Science; vol. 1800; Proceedings of the 15 OPDPS 2000 Workshop on Parallel and Distributed Processing; 8 pages; 2000.
Lam et al., "Limits of Control Flow on Parallelism"; ACM; pp. 46-57; 1992.
Larsen et al., "Exploiting Superword Level Parallelism with Multimedia Instruction Sets"; (PLDI'00); ACM; pp. 145-156; 2000.
Lee et al., "MediaBench: A Tool for Evaluating and Synthesizing Multimedia and Communications Systems"; International Symposium on Microarchitecture; pp. 330-335; 1997.
Lee et al., "Region-Based Caching: An Energy-Delay Efficient Memory Architecture for Embedded Processors"; (CASCS '00) ACM; pp. 120-127; 2000.
Leenstra et al., "A 1.8 GHz Instruction Buffer"; IEEE; pp. 314-315 and 459; 2001.
Levinthal et al., "Chap—A SIMD Graphics Processor"; Computer Graphics, vol. 18(3) (Jul. 1984).
Lie et al., "Architectural Support for Copy and Tamper Resistant Software"; Proc. of the 6th Int'l Conf. Architectural Support for Programming Languages and Operating Systems, ACM; 10 pages. (2000).
Loughry et al., "Information Leakage from Optical Emanations"; ACM Trans. on Information and System Security, vol. 5(3); 28 pages (2002).
MAC OS Runtime Architecture for System 7 Through MAC OS 9, Ch. 7 (Pub. Jan. 31, 1997 © Apple Inc.). [online] Retrieved from the Internet: <URL:http://developer.apple.com/documentation/mac/pdf/MacOS_RT_Architectures.pdf? [Retrieved on Aug. 13, 2009].
Manne et al., "Pipeline Gating: Speculating Control for Energy Reduction"; IEEE; pp. 132-141; 1998.
Marculescu, D., "Profile-Driven Code Execution for Low Power Dissipation"; (ISPLED'00); ACM; pp. 253-255; 2000.
Maro et al., "Dynamically Reconfiguring Processor Resources to Reduce Power Consumption in High-Performance Processors, Workshop on Power-Aware Computer Systems"; (PACS '00/LNCS 2008) ACM; pp. 97-111; 2001.
Memik et al., "A Selective Hardware/Compiler Approach for Improving Cache Locality"; Center for Parallel and Distributed Computing, Northwestern University; pp. 1-21; 2000.
Menezes et al., "Handbook of Applied Cryptography"; CRC Press (CRC Press Series on Discrete Mathematics and Its Applications) (1997).
Messerges et al., "Examining Smart Card Security Under the Threat of Power Analysis Attacks"; IEEE Trans. on Computer, vol. 51(5); pp. 541-552 (2002).
Michaud et al., "Data-Flow Prescheduling for Large Instructions Windows in Out-of-Order Processors, 7th International"; IEEE; pp. 27-36; 2001.
Milutinovic et al., "The Split Temporal/Spatial Cache: Initial Performance Analysis"; Proceedings of the SCIzzL-5, 8 pages; 1996.
Mirsky et al., "MATRIX: A Reconfiguration Computing Architecture with Configurable Instruction Distribution and Deployable Resources"; Proc. of the IEEE Symposium on FPGs for Custom Computing Machines; pp. 157-166 (1996).
Montanaro et al., "A 16-Mhz, 32b, 0.5-W CMOS RISC Microprocessor"; IEEE, 31(11):1703-1714; 1996.
Moritz et al., "Adaptive Distributed Software Virtual Memory for Raw"; Laboratory for Computer Science, Raw Group; MIT, Cambridge; Jan. 1999.
Moritz et al., "Exploring Cost-Performance Optimal Designs of Raw Microprocessors"; The 6th Annual IEEE Symposium on Field-Programmable Custom Computing Machines FCCM'98; Napa, CA; Apr. 1998.
Moritz et al., "Fault-Tolerant Nanoscale Processors on Semiconductor Nanowire Grids"; IEEE Transactions on Circuits and Systems I, special issue on Nanoelectronic Circuits and Nanoarchitectures, vol. 54, iss. 11; pp. 2422-2437; Nov. 2007.
Moritz et al., "FlexCache: A Framework for Flexible Compiler Generated Data Caching"; Proc. of the 2nd Intelligent Memory Workshop, IRAM00; Cambridge, MA; Nov. 2000.
Moritz et al., "Hot Pages: Design and Implementation of Software Caching for Raw"; IBM Research Lab; Austin; May 1999.
Moritz et al., "Hot Pages: Software Caching for Raw Microprocessors"; International Symposium for Computer Architecture (ISCA-27); Massachusetts Institute of Technology, Cambridge, MA; pp. 1-12; 1999.
Moritz et al., "Latching on the Wire and Pipelining in Nanoscale Designs"; 3rd Workshop on Non-Silicon Computation (NSC-3), ISCA'04; Germany; Jun. 2004.
Moritz et al., "LoGPC: Modeling Network Contention in Message-Passing Programs"; ACM Joint International Conference on Measurement and Modeling of Computer Systems, ACM Sigmetrics/Performance '98 Wisconsin Madison; Jun. 1998; also in ACM Performance Evaluation Review Special Issue; vol. 26, No. 1.
Moritz et al., "LOGPC: Modeling Network Contention in Message-Passing Programs"; IEEE Transactions on Parallel and Distributed Systems, vol. 12, No. 4; pp. 404-415; Apr. 2001.
Moritz et al., "Security Tradeoffs in NEST"; DARPA Presentation; Dec. 2003.
Moritz et al., "SimpleFit: a Framework for Analyzing Design Tradeoffs in Raw Architectures"; IEEE Transactions on Parallel and Distributed Systems, vol. 12, No. 7; pp. 730-742; Jul. 2001.
Moritz et al., "Towards Defect-tolerant Nanoscale Architectures"; Invited Paper, IEEE Nano2006; 2006.
Mueller et al., "Predicting Instruction Cache Behavior"; Jun. 1994, ACM SIGPLAN Workshop on Language, Compiler and Tool Support for Real-Time Systems.
Narayanan et al., "CMOS Control Enabled Single-Type FET NASIC"; Best Paper Award, IEEE Computer Society Annual Symposium on VLSI 2008; 2008.
Narayanan et al., "Comparison of Analog and Digital Nano-Systems: Issues for the Nano-Architect"; IEEE International Nanoelectronics Conference (INEC); 2008.
Narayanan et al., "Image Processing Architecture for Semiconductor Nanowire based Fabrics"; accepted by IEEE 8th International Conference on Nanotechnology; 2008.
National Bureau of Standards, "Data Encryption Standard", Tech. Rep. NBS FIPS Pub. 46, Nat'l Bur. Standards, US Dept. of Commerce; Jan. 1977.

(56) References Cited

OTHER PUBLICATIONS

Nicolau et al., "Measuring the Parallelism Available for Very Long Instruction Word Architectures"; IEEE Transactions on Computer, 33(11):968-976; 1984.
Oppenheim, A. et al., "Discrete-Time Signal Processing"; Prentice-Hall; Upper Saddle River, NJ (1999).
Ors et al., "Power-Analysis Attack on an ASIC AES Implementation"; Proc. of Int'l Symp. on Information Tech. [online] Retrieved from the Internet: <URL:http://citeseerx.ist.psu.edu/viewdoc.download?doi=10.1.1.88.2697&rep=rep1&type=pdf> [retrieved on Feb. 22, 2011] (ITCC 2004).
Palacharla et al., "Complexity-Effective Superscalar Processors"; (ISCA'97) ACM; pp. 206-218; 1997.
Panda et al., "Efficient Utilization of Scratch-Pad Memory in Embedded Processor Applications"; IEEE; pp. 7-11; 1997.
Parikh et al., "Power Issues Related to Branch Prediction"; (HPCA'02); IEEE; 12 pages; 2002.
Pering et al., "Dynamic Voltage Scaling and the Design of a Low-Power Microprocessor System"; In Power Driven Microarchitecture Workshop, attached to ISCA98; Jun. 1998.
Ponomarev et al., "Reducing Power Requirements of Instructions Scheduling Through Dynamic Allocation of Multiple Datapath Resources"; IEEE; pp. 90-101; 2001.
Postiff et al., "The Limits of Instruction Level Parallelism in SPEC95 Applications"; Computer Architecture News, vol. 217(1); 10 pages; 1999.
Powell et al., "Reducing Set-Associative Cache Energy via Way-Prediction and Selective Direct-Mapping"; IEEE; pp. 54-65; 2001.
PowerPC Upgrade FAQ, Powerbook 500 Series PPC Upgrade from IMAX (dated Jan. 28, 1997) [online] Retrieved from the Internet: <URL: http://www.darryl.com/ppcfaq.html> [retrieved on Aug. 13, 2009].
Prasad et al., "Efficient Search Techniquest in the Billion Transistor Era"; Invited paper, appears in PDPTA, Las Vegas, NV; 2001.
Qi et al., "A Unified Cache Coherence and Synchronization Protocol"; Boston Area Architecture Workshop (BARC-2004); Jan. 2004.
Quisquater et al., "Electromagnetic Analysis (EMA) Measures and Counter-Measures for Smart Cards"; E-smart 2001, LNCS 2140; pp. 200-210 (2001).
Ramierz et al., "Branch Prediction Using Profile Data"; Springer-Verlag Berlin Heidelberg; pp. 386-394; 2001.
Ranganthan et al., "Reconfigurable Caches and their Application to Media Processing"; (ISCA'00); ACM; pp. 214-224; 2000.
Rao et al., "EMPowering Side-Channel Attacks"; IBM Research CTR. [online] Retrieved from the Internet: <URL:http://eprint.iacr.org/2001/037.pdf> [retrieved on Feb. 22, 2011] (May 2001).
Reinman et al., "An Integrated Cache Timing and Power Model"; COMPAQ Western Research Lab; pp. 1-20; 1999.
Rugina et al., "Pointer Analysis for Multithreaded Programs"; Proc. of SIGNPLAN'99 Conf. on Program Language Design and Implementations; May 1999.
Sair et al., "Memory Behavior of the SPEC2000 Benchmark Suite"; IBM Thomas J. Watson Research Center Technical Report RC-21852; pp. 1-8; Oct. 2000.
Sanchez et al., "Static Locality Analysis for Cache Management"; pp. 261-271; 1997.
Schlansker et al., "Achieving High Levels of Instruction-Level Parallelism with Reduced Hardware Complexity"; Hewlett Packard Laboratories (HP-96-120); pp. 1-85; 1994.
Schneier et al., "Applied Cryptography, 2nd Ed."; pp. 13 and 270-278; John Wiley & Sons, Inc. (pub), (1996).
Schwartz et al., "Disassembly of Executable Code Revisited"; Proc. 9th Working Conf. on Reverse Engineering (WCRE'02); 10 pages. (2002).
Simunie et al., "Source Code Optimization and Profiling of Energy Consumption in Embedded Systems"; Proc. 13th Int'l Symposium on System Synthesis; pp. 193-198; 2000.
Singh et al., "Short Range Wireless Connectivity for Next Generation Architectures"; Invited paper, appears in PDPTA, Las Vegas, NV; 2001.

Skorobogatov et al., "Optical Fault Induction Attacks"; Proc. of Cryptographic Hardware and Embedded Systems (CHES'02), LNCS 2523; pp. 2-12 (2003).
Skorobogatov, S., "Breaking Copy Protection in Microcontrollers" [online] Retrieved from the Internet: <URL: http://www.cl.cam.ac.uk/~sps32/mcu_lock.html> [retrieved on Feb. 22, 2011] (2000).
Skorobogatov, S., "Data Remanence in Flash Memory Devices"; Proc. of Cryptog. Hardware and Embedded Systems (CHES2005) [online] Retrieved from the Internet: URL:http://s3.amazonaws.com/ppt-download/data-remanence-in-flash-memory-devices1949.pdf?response-content-disposition=attachment
&Signature=p51Xjx2Qcu760LiE02JwBVQHCo%3D
&Expires=1298390877
&AWSAccessKeyId=AKIAJLT267DEGKZDHEQ> [Retrieved on Feb. 22, 2011] (2005).
Skorobogatov, S., "Tamper Resistance and Physical Attacks"; Summer School on Cryptographic Hardware, Side-Channel and Fault Attacks (ECRYPT-2006); Jun. 12-15, 2006; Louvain-la-Neuve [online] Retrieved from the Internet: <URL:http://www.cl.cam.au.uk/~sps32/#Publications> [retrieved on Feb. 22, 2011] (2006).
Sohi et al., "Instruction Issue Logic for High-Performance, Interruptible Pipelined Processors"; ACM; pp. 27-34; 1987.
Srivastava et al., "Atom: A System for Building Customized Program Analysis Tools"; Proc. of ACM SIGPLAN'94 Conf. on Programming Language Design and Implementation; pp. 196-205 (1994).
Stanford University SUIF Compiler Group [online] Retrieved from the Internet: <URL:http://suif.stanford.edu/> [retrieved on May 4, 2004.
Steensgard, B., "Points-to analysis in Almost Linear Time"; POPL96; 1996.
Steinke et al., "Reducing Energy Consumption by Dynamic Copying of Instructions onto Onchip Memory"; 2002, Proceedings of the 15th International Symposium on System Synthesis; pp. 213-218.
Telikepalli, A., "Is Your FPGA Design Secure?"; XCELL Journal, [online] Retrieved from the Internet <URL:http://cdserv1.wbut.as.in/81-312-0257-7/Xilinx/files/Xcell%20Journal%20Articles/xcell_47/xc_secure47.pdf> [retrieved on Feb. 22, 2011] (2003).
The Standard Performance Evaluation Corporation; http://www.spec.org (© 2002).
Trichina et al., "Secure AES Hardware Module for Resource Constrained Devices"; ESAAS 2004; Lec. Notes in CompSci3313, [online] Retrieved from the Internet: <URL:http://citeseerx.ist.psu.edu/viewdoc.download?doi=10.1.1.95.6712&rep=rep1&type=pdf> [retrieved on Feb. 22, 2011] (2005).
Tune et al., "Dynamic Predictions on Critical Path Instructions"; IEEE; pp. 185-195; 2001.
Tygar et al., "Dyad: A System for Using Physically Secure Coprocessors"; Tech. Rep. CMU-CS-91-140R; Carnegie Mellon University; 38 pages (1991).
Unnikrishnan et al., "Dynamic Compilation for Energy Adaptation"; 2002, IEEE/ACM International Confrerence on Computer Aided Design.
Unsal et al., "An Analysis of Scalar Memory Accesses in Embedded and Multimedia Systems"; High Performance Memory Systems; Springer-Verlag; 2003.
Unsal et al., "Cook-Cache: A Caching Framework for Multimedia Embedded Systems"; to appear in IEEE Transactions on Embedded Systems, Special Issue on Low-Power; 2002.
Unsal et al., "Cool-Cache for Hot Multimedia"; in Proc. of the 34th Annual International Symposium on Microarchitecture (MICRO-34); Austin, TX; pp. 274-283; Dec. 2001.
Unsal et al., "Cool-Cache: A compiler-enabled energy efficient data caching framework for embedded/multimedia processors"; ACM Transactions on Embedded Computing Systems (TECS); vol. 2(3):373-392; Aug. 2003.
Unsal et al., "Cool-Fetch: A Compiler-Enabled IPC Estimation Based Framework for Energy Reduction"; Proc. for the 8th Annual Workshop on Interaction between Compilers and Computer Architecture (Interact-8); pp. 43-52; Feb. 2004.
Unsal et al., "Cool-Fetch: Compiler-Enabled Power-Aware Fetch Throttling"; IEEE Computer Architecture Letters; vol. 1; 2002.

(56) References Cited

OTHER PUBLICATIONS

Unsal et al., "Cool-Fetch: IPC Prediction Based Compiler-enabled Fetch Throttling for Energy Efficiency"; ACM Computer Architecture Letters; May 2002.

Unsal et al., "High Level Power-Reduction Heuristics for Embedded Real-Time Systems"; University of Massachusetts; pp. 1-6; 2000.

Unsal et al., "On Memory Behavior of Scalars in Embedded Multimedia Systems"; Workshop of Memory Performance Issues (ISCA); Goteborg, Sweden; Jun. 2001.

Unsal et al., "Power-Aware Replication of Data Structures in Distributed Embedded Real-Time Systems"; IPDPS 2000 Workshops; pp. 839-846.

Unsal et al., "The Minimax Cache: An Energy Efficient Framework for Media Processors"; IEEE; pp. 131-140; 2002.

van Eck, W., "Electronic Radiation from Video Display Units: An Eavesdropping Risk?" Computer & Security [online] Retrieved from the Internet: <URL:http://jya.com/emr.prd> [retrieved on Feb. 22, 2011] (1985).

Vinciguerra et al., "An Experimentation Framework for Evaluating Disassembly and Recompilation Tools for C++ and Java"; IEEE Proc. of the 10th Working Conf. on Reverse Engineering (WCRE'03); 10 pages (2003).

Voronin, A., "Data Storage on Hard Disks" [online] Retrieved from the Internet: <URL: http://www.digit-life.com/articles/bootman/index.html> [retrieved on Aug. 27, 2008].

Wall, David W., "Limits of Instruction-Level Parallelism"; ACM; pp. 176-188; 1991.

Wang et al., "Combining 2-Level Logic Families in Grid-Based Nanoscale Fabrics"; accepted by IEEE/ACM Symposium on Nanoscale Architectures(NanoArch'07); Oct. 2007.

Wang et al., "Combining Circuit Level and System Level Techniques for Defect-tolerant Nanoscale Architectures"; 2nd IEEE International Workshop on Defect and Fault Tolerant Nanoscale Architectures (NanoArch 2006); Boston, MA; Jun. 2006.

Wang et al., "Compiler-Based Adaptive Fetch Throttling for Energy Efficiency"; Proc. of the 2006 IEEE International Symposium on Performance Analysis of Systems and Software (ISPASS'06); Austin, TX; Mar. 2006.

Wang et al., "Exploring Nanoscale Application-Specific ICs and Architectures"; Boston Area Architecture Workshop (BARC-2004); Jan. 2004.

Wang et al., "NACISs: A Nanoscale Fabric for Nanoscale Microprocessors"; IEEE International Nanoelectronics Conference (INEC); 2008.

Wang et al., "Opportunities and Challenges in application-Tuned Circuits and Architectures Based on Nanodevices"; Proceedings of the First Conference on Computing Frontiers; pp. 503-511; Italy; Apr. 2004.

Wang et al., "Self-Healing Wire-Streaming Processors on 2-D Semiconductor Nanowire Fabrics"; NSTI (Nano Science and Technology Institute); Nanotech 2006; Boston, MA; May 2006.

Wang et al., Wire-Streaming Processors on 2-D Nanowire Fabrics; NSTI (Nano Science and Technology Institute); Nanotech 2005; California; May 2005.

Weber "Hammer: The Architecture AMD's of Next-Generation Processors"; Microprocessor Forum; 2001.

Weingart et al., "Physical Security Devices for Computer Subsystems: A Survey of Attacks and Defenses"; Workshop on Cryptographic Hardware and Embedded Systems (CHES2000), LNCS 1965; pp. 302-317 (2000).

White, R., "How Computers Work"; Millennium Edition, Que Corporation; 1999; p. 36.

Wikipedia entry for "context switch", (Pub. Oct. 26, 2001) [online] Retrieved from the Internet: <URL: http://en.wikipedia.org/w/index.php?title=Context_switch&oldid=244184> [retrieved on Aug. 13, 2009].

Wilson et al., "Efficient Context-Sensitive Pointer Analysis for C Programs"; Proc. ACM SIGPLAN'95 Conf. on Programming Language Design and Implementation; Jun. 1995.

Wilton et al., "CACTI: An Enhanced Cache Access and Cycle Time Model"; IEEE-Journal of Solid-State Circuits; 31(5):677-688; 1996.

Witchel, E., "Direct Addressed Caches for Reduced Power Consumption"; IEEE; pp. 124-133; 2001.

Wollinger et al., "How Secure are FPGAs in Cryptographic Applications"; Proc. of the 13th Int'l Conf. on Fielf-Programmable Logic and Applications (FPL-2003); 11 pages (2003).

Wollinger et al., "Security on FPGAs: State of the Art Implementations and Attacks"; ACM Transactions on Embedded Computing Systems (TECS) TECS Homepage archive vol. 3 Issue 3, [online] Retrieved from the Internet: <URL:http://www.wollinger.org/papers/Wollingeretal_ACMTransEmbeddedSysFPGACryptoOverview.pdf> [retrieved on Feb. 22, 2011] (Aug. 2004).

Yang et al., "An Integrated Circuit/Architecture Approach to Reducing Leakage in Deep-Submicron High-Performance I-Caches"; IEEE; pp. 147-157; 2001.

Young et al., "Improving the Accuracy of Static Branch Prediction Using Branch Correlation"; ACM; pp. 232-241; 1994.

Zhang et al., "Compiler Support for Reducing Leakage Energy Consumption"; Proc. of the Design, Automation and Test in Europe Conference and Exhibition [DATE'03]; Mar. 2003.

Zhang et al., "Highly-Associative Caches for Low-Power Processors"; Kool Chips Workshop; 33rd International Symposium on Microarchitecture; 6 pages; 2000.

Zyuban et al., "Inherently Lower-Power High-Super-Performance Superscalar Architectures"; IEEE Transactions on Computers, 50(3):268-285; 2001.

\* cited by examiner

ENERGY-FOCUSED RE-COMPILATION OF EXECUTABLES AND HARDWARE MECHANISMS BASED ON COMPILER-ARCHITECTURE INTERACTION AND COMPILER-INSERTED CONTROL

RELATED U.S. APPLICATION DATA

This continuation application (and claims the benefit of priority under 35 USC 120) of U.S. application Ser. No. 10/967,989 filed Oct. 18, 2004, which claims priority to U.S. Provisional Application No. 60/515,260, filed on Oct. 29, 2003. The disclosures of U.S. application Ser. No. 10/967,989 and of U.S. Provisional Application Ser. No. 60/515,260 are considered part of (and are incorporated by reference in) the disclosure of this application.

TECHNICAL FIELD

This invention relates generally to reducing energy and power consumption and improving performance in a microprocessor and, more particularly, to reducing energy and power consumption and improving performance by modifying a program executable. In addition, it relates to hardware mechanisms that use compiler control inserted into selected sequences of instructions to reduce energy consumption. Furthermore, it relates to compiler-exposed parallelism on compiler-selected program sequences that enables energy-efficient parallel execution with minimal hardware support required.

BACKGROUND

Microprocessors (referred to herein simply as "processors") consume energy/power during their operation. It is advantageous to reduce the amount of energy consumed, particularly in the case of devices that run off limited power supplies.

Various factors affect the amount of energy that a processor consumes. For example, the frequency at which the processor operates, the voltage level that powers the processor, as well as the load capacitances affect processor energy consumption. Reducing the frequency of the processor or the voltage supply may decrease processor energy consumption, however, doing so may also adversely affect the performance of the processor.

Other techniques to reduce energy consumption by, for example, reducing load capacitances, may include changes to processor architectures and processor circuits. Some other techniques rely on modifying the application itself, or any other system layer, to improve energy efficiency.

An executable is a version of a software application that has been compiled from a programming language into a processor instruction set.

A source-level compiler transforms source codes into a sequence of instructions based on a processor instruction set.

Incorporating energy awareness into a source-level compiler is a very complex process; it could also negatively affect performance or some other design objective. This is due to the interactions between optimizations that target different objectives.

Additionally, not all source codes might be available for source-level compilation of an application, and therefore not all codes could be optimized in order to improve energy efficiency or reduce power consumption.

Moreover, the modifications would need to be incorporated in all compilers that aim to optimize energy consumption.

For a given processor there are typically many compilers available provided by many different vendors. These compilers have their own advantages and disadvantages.

This makes incorporating energy optimizations to source-level compilers a challenging task.

Accordingly, if energy-awareness is introduced at the executable-level instead, by transforming the executable itself, significant practical advantages could be achieved.

The goal would be to optimize executables that may have been fully optimized previously with a source-level compiler targeting a design aspect such as performance.

In general, such an executable-level re-compiling based approach to energy optimizations, could enable keeping optimizations performed during source-level compilation largely intact, could provide access to and optimize all program codes including static and dynamic libraries, and could be used on existing executable codes that have been generated with a variety of different compilers and potentially from different vendors.

The executable file itself provides a convenient interface between, for example, performance-oriented optimizations and energy-oriented optimizations. Moreover, one energy optimization tool or layer could be used with many different source-level compilers; this does away the need to retrofit all source compilers to optimize energy consumption.

Another aspect of this invention relates to scalability. Reductions in energy consumption should also be scalable, meaning that they are implemented such that processors having different architectures and instruction sets can easily be targeted. An executable-level re-compiling approach could provide such scalability.

This aspect may include an energy-aware program representation that encapsulates information reconstructed from executables in an abstract and retargetable manner to achieve scalability.

Another aspect of this invention relates to how application parallelism can be exploited in processors without significantly increasing load capacitances. If parallelism is achieved but with an increase in load capacitances, due to hardware complexities, the advantage of improved performance is offset by the resultant much higher power consumption. Current state-of-the-art solutions to expose parallelism are not energy efficient. As such, many of today's low-power processors are single issue.

Incorporating compiler information to enable issuing multiple instructions in parallel with a Very Large Instruction Word (VLIW) format has been shown to be detrimental to energy consumption. The term VLIW refers to the size of each instruction that is executed by a processor. This instruction is very long in comparison to the instruction word size utilized by most current processors.

Energy inefficiency in a VLIW processor is often attributed to the fixed wide-issue instruction set format; in many applications or program sequences there is not enough parallelism to fill all the instruction slots available in a VLIW instruction.

In fact, on average, there is typically very little instruction-level parallelism (ILP) available. As noted in the literature, typical applications have an average ILP level of less than two; thus, a 4-way VLIW would have on average two of its instruction slots unutilized. The unused slots would contribute to unnecessary instruction fetches and instruction-memory energy consumption. Higher ILP levels are fundamentally limited by true data dependencies. While speculation-based techniques can improve ILP levels, runtime speculation has an energy cost that typically offsets the benefits of the higher ILP.

As noted in the literature, energy consumed by the instruction memory as well as fetch energy are a significant fraction of a processor energy consumption. For example, a state-of-the-art ARM10 processor has been reported to consume 27% of its total energy in the instruction memory system.

Other systems such as superscalar processors attempt to discover parallelism at runtime with significant hardware support. This support reduces the energy benefits obtained with parallel execution. Simply, the performance benefits are more than offset by the increase in load capacitances that increase power consumption.

In one aspect, the present invention solves the problem of exposing parallelism without requiring significant hardware support, such as is required in superscalar designs, and without having a fixed wide-issue instruction format, such as in VLIW designs. The solution is adaptive and compiler driven.

It works by incorporating control bits into the binary to issue instructions in parallel on only selected sequences of instructions, on compiler demand. The approach could be limited to sequences where there is enough parallelism and when is considered or estimated to be good for energy efficiency. Thus, parallelism encoding can be limited to critical program paths, typically a relatively small fraction of the instructions in a binary, to improve energy efficiency.

In addition, if other compiler-managed optimizations are incorporated, such as for energy reduction purposes in the memory system, the added instruction bits for the various optimizations could be encapsulated into one or more new control instructions or control data. If the control is implemented with instructions, both regular instructions that are extensions to the regular ISA or co-processor instructions can be used.

In one embodiment, a solution to incorporate control information is to use the co-processor interface, that is, without requiring changes to the processor's regular instruction set. The inserted instructions may be folded, i.e., extracted early, in the prefetch queue before entering the processor pipeline, in a somewhat similar manner to zero-cycle branches in some architectures, e.g., ARM10. Such a solution removes pipeline bubbles that might otherwise be caused by the control instructions. An advantage, therefore, of using co-processor instructions is that one could easily add such control to existing processor cores. In one embodiment that is implemented within an ARM 10 design, each such control instruction would enable the encoding of 21 bits worth of control information.

Control information may be added per a sequence of instructions, such that the code dilution overhead of static control could be amortized across several different optimizations and for several instructions in the sequence. The sequence where optimization is applied can be determined with static analysis or other means such as profiling. A control instruction is typically inserted before the controlled instruction sequence.

Energy increase due to the extra fetches can be minimized with compiler-driven instruction memory optimizations, for example, by almost always fetching control bits from more energy efficient smaller cache partitions, driven by compiler decisions. One aspect of this invention demonstrates such capability.

Due to the compiler-driven nature of the solution, the impact of control overhead can be kept very small. In our experience, in one embodiment, such control energy overhead could be kept below 1%-2% if instruction memory energy optimizations are included, while providing energy optimizations in the range of 30%-68% if several techniques in different processor domains/components are included.

SUMMARY

The executable-level modification or executable re-compilation, and compiler-architecture interaction based processor framework described herein address the foregoing need to reduce energy consumption in a practical and flexible manner. The approach provides energy savings without adverse effects on performance and with scalability, to different processor instructions sets, and easy integration with other compilation tools. In fact, the framework in its preferred embodiment, when incorporating support for compiler-driven parallel issuing of instructions, improves performance.

The framework, in one of its embodiments, eliminates the need for reengineering of source-level compilers to target energy efficiency. The framework can be used in, but is not limited to, converting existing executables where source codes are not always available to achieve a more energy efficient operation.

The executable-level re-compilation approach could also transform static libraries that may be part of an executable, or even dynamic libraries. Sources of such libraries are typically not available at the time of source-level compilation of applications, and, therefore, would not be affected by source-level compilation based energy optimizations. In one aspect, this invention enables the global optimization of all application codes together, including libraries, for example, to target energy reduction.

In general, there might be several compilers available for one particular processor or an instruction set architecture. The approach based on executables can be easily integrated with some or all of these compilers without requiring changes in the source-level compiler.

In one aspect, the framework does this by extracting and utilizing static compile-time information from fully linked and optimized executables, and by modifying the executables according to new design goals such as energy efficiency.

In principle, a source-level compiler could augment an executable to support the energy optimization process based on executable re-compilation. The framework may include support for using such information.

The framework is also applicable at pre-linking level and on other versions of an executable.

The framework could be applied on executables that might contain symbolic information that was inserted for debugging purposes, or, for example, targeting energy optimizations.

The framework could be utilized to perform optimizations that are not limited to energy reduction. Examples of optimizations performed may include, but are not limited to, energy, power, performance and security. In general, in one aspect, the framework could be used to improve an application's performance or improve the application's energy-delay product or any other metric that is a combination of execution time and power consumption.

The executable-level modifications can be used in combination with added architectural support, or with unchanged architecture, to gain benefits.

When used without added architectural support the framework optimizes the instruction stream so as to reduce energy consumption or improve performance on an existing hardware solution.

When used with added architecture support, the framework could provide unique opportunities for compiler-architecture based optimizations, by incorporating support for statically-managed architectural mechanisms in a processor, that are typically much more energy-efficient than conventional dynamic mechanisms.

Statically-managed access mechanisms use static information to reduce redundancy typically present in conventional instruction execution. In fact, each instruction can be represented as a sequence of micro-operations during execution.

Example of such micro-operations may include tag checks in caches, multi-way lookups in associative data arrays, virtual memory related address translations, Translation Lookaside Buffer accesses, and register file accesses. Many of these micro-operations are not necessary if there is related information extracted in the compiler that provides it, or if there is program information that enables a way to replace these micro-operations with more energy-efficient but equivalent ones.

Disambiguating an executable is the process of extracting symbolic information and disassembling program instructions from an executable. In one aspect, the invention is directed to a method, for use in a processor, which includes disambiguating the application executable into an intermediate format, performing a number of analyses on this format to statically determine program characteristics, and changing a program's structure and instructions such that the estimated energy consumption of the program after the changes is less than the energy consumption of the original unmodified program. This aspect may include one or more of the following features.

The method may include identifying aspects of the program including branches, procedure call points, memory related operations and their locality and reuse patterns, criticality of each instruction in the instruction stream from the point of view of performance, power, and energy consumption, and other similar static information.

The method may include static executable disambiguation and late code modification techniques and may include using abstract execution, in addition to static analysis, to help the disambiguation process. Abstract execution is a process based on which short sequences of instructions are executed abstractly using an abstract machine.

Abstract execution may be integrated in the compiler and may operate in a forward and/or backward manner. Abstract execution is a process of running a simulation engine during program analysis, to help disambiguate, for example, program-flow or memory access patterns, but is not limited to only those aspects. While in its preferred embodiment this simulation engine is a very small functional simulator kernel optimized to run in a compiler, the framework is not limited to only such a simulator.

Furthermore, the method may include inserting a more energy efficient instruction replacing an existing instruction and may include inserting control bits to control hardware structures.

In one aspect, the control bits and/or instructions may be implemented as extensions to the regular instruction set of a processor, and/or as co-processor instructions, and/or as data.

The control bits may also be implemented as data added to the executable, data that is associated with segments of instructions and that are accessed during execution by a processor. This aspect may include dedicated architectural support to map instruction sequences to corresponding control bits efficiently. This may include changes to an architecture structure such as the branch target address cache, that would associate the target address with a target static control data, controlling a sequence of instructions such as a basic block, or super block consisting of several basic blocks, starting after the target address. This data could be part of the instruction memory similar, for example, to how constants are used in many instruction sets. A basic block is a sequence of instructions that has no branch instructions except possibly the last instruction and has only one entry point, from other parts of the code, that is at the top of the block.

The control bits could control one or several instructions in the instruction stream during execution. A possible objective is to enable energy reduction of these controlled instructions at runtime, by letting the processor know ahead of execution their preferred execution modes to reduce energy.

If the control bits refer to controlling several instructions during runtime, such as in a basic block, one control instruction inserted before the block may include control information for a variety of optimizations amortizing its added overhead across many optimizations. The performance overhead of control instructions could be avoided with early folding/removal in processor pipelines with simple pre-decoding logic added to prefetch buffers and instruction fetching. In many predicated architectures a similar early folding is used for example to achieve zero-cycle branches.

Another aspect may include optimizing control-bits related fetch energy by compile-time mapping and runtime fetching of the control-bits from an energy optimized memory structure instead of the conventional data and/or instruction cache.

In general, in one preferred embodiment, the framework may include modifications to an executable such that dedicated architecture support, that may target energy reduction with the help of static information provided by the framework, can be leveraged.

Furthermore, the method may include, but is not limited to, performance-efficient relocation techniques of memory and branch addresses in an executable.

As a result, processors using this framework require less energy to operate. Individual instructions may consume less power to execute. Furthermore, the framework is applicable to processors having different architectures and is therefore scalable.

The invention can be used to save energy on any type of device that includes a processor. For example, the invention can be used to save energy on personal computers, devices containing embedded controllers, sensor networks, network appliances, hand-held devices, cellular telephones, and emerging applications based on other device technologies.

Unless otherwise defined, all technical and scientific terms used herein have the same meaning as commonly understood by one of ordinary skill in the art to which this invention belongs. Although methods and materials similar or equivalent to those described herein can be used in practice or testing of the present invention, suitable methods and materials are described below. In addition, the materials, methods, and examples are illustrative only and not intended to be limiting.

Other features and advantages of the invention will become apparent from the following description, including the claims and drawings.

DESCRIPTION

In the embodiments described herein, a processor framework uses compile-time information extracted from an executable and the executable is then transformed so as to reduce or enable reduction of energy or power consumption, and/or improve performance in a processor. In one embodiment, a reduction can be achieved without requiring special architecture support. In another embodiment, dedicated architecture support could provide unique optimization opportunities based on compiler-architecture interaction. In one aspect, this includes statically managed energy-efficient access mechanisms, such as in the instruction memory, and energy-efficient compiler-driven parallel instruction issue management techniques. This architectural support may be controlled through either executable compilation or source-level compilation. The executable compilation is a method described in the invention.

Figure 1:
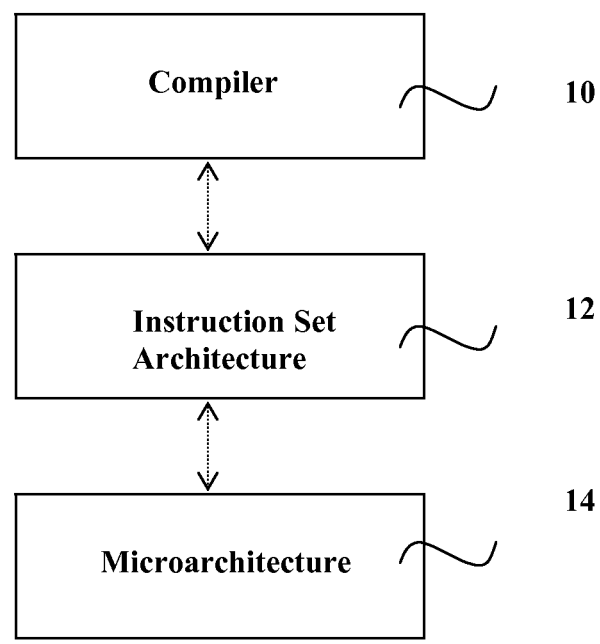
FIG. 1 is a block diagram showing the relationship between a source-level compiler, instruction set architecture, and microarchitecture in a processor.

Referring to FIG. 1, a compiler 10 is a software system that programs circuitry to translate applications from high-level programming languages (e.g., C, C++, Java) into machine specific sequences of instructions. An instruction set architecture (ISA) 12 is a set of rules that defines the encoding of operations into machine specific instructions. The ISA acts as the interface between compiler (10) and the microarchitecture (14). A computer program is a collection of machine level instructions that are executed to perform a desired functionality. Micro-architectural (or architectural) components 14 comprise primarily hardware and/or software that are used during execution of the program. The actual machine can be a microprocessor or any other device that is capable of executing instructions that conform to the encoding defined in the ISA.

Compile-time refers to the time during which the program is translated from a high-level programming language into a machine-specific stream of instructions, and it is not part of execution or runtime. Runtime is the time it takes to execute translated machine instructions on the machine. Compilation is typically performed on a different host machine than execution and it is done on the source program. Energy consumed during compilation does not therefore contribute to the energy consumption of the device targeted.

Executable-level re-compilation is a process that uses an application's executable as input and performs analysis and modifications at the executable-level. Executable-level compilation is similar to source-level compilation in that it is performed on a different host machine than execution and that during compilation one does not consume energy in the device targeted with the compiled application.

Figure 2:
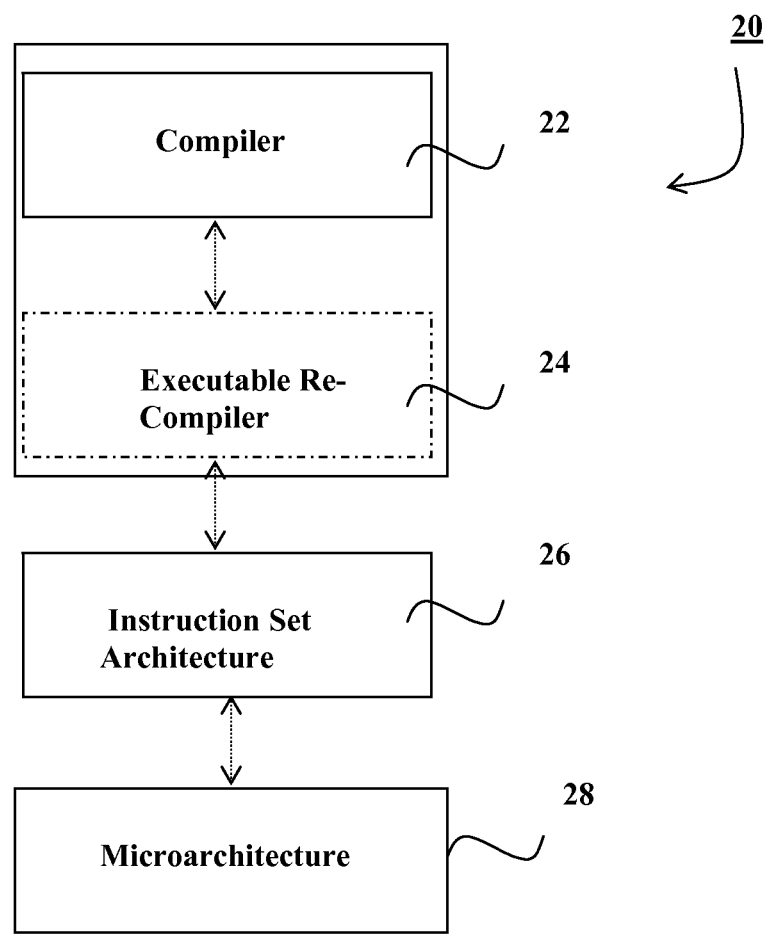
FIG. 2 is a block diagram showing the relationship between the executable-level re-compiler, conventional source-level compiler, instruction set architecture, and microarchitecture in a processor.

Referring to FIG. 2, an executable-level re-compiler or executable-level compiler 24 is a software system that programs circuitry to translate applications from executable-level into machine-specific sequences of instructions 26. Components 26 and 28 are similar to the components 12 and 14 in a conventional compiler system as shown in FIG. 1.

Scanning an Executable

Figure 3:
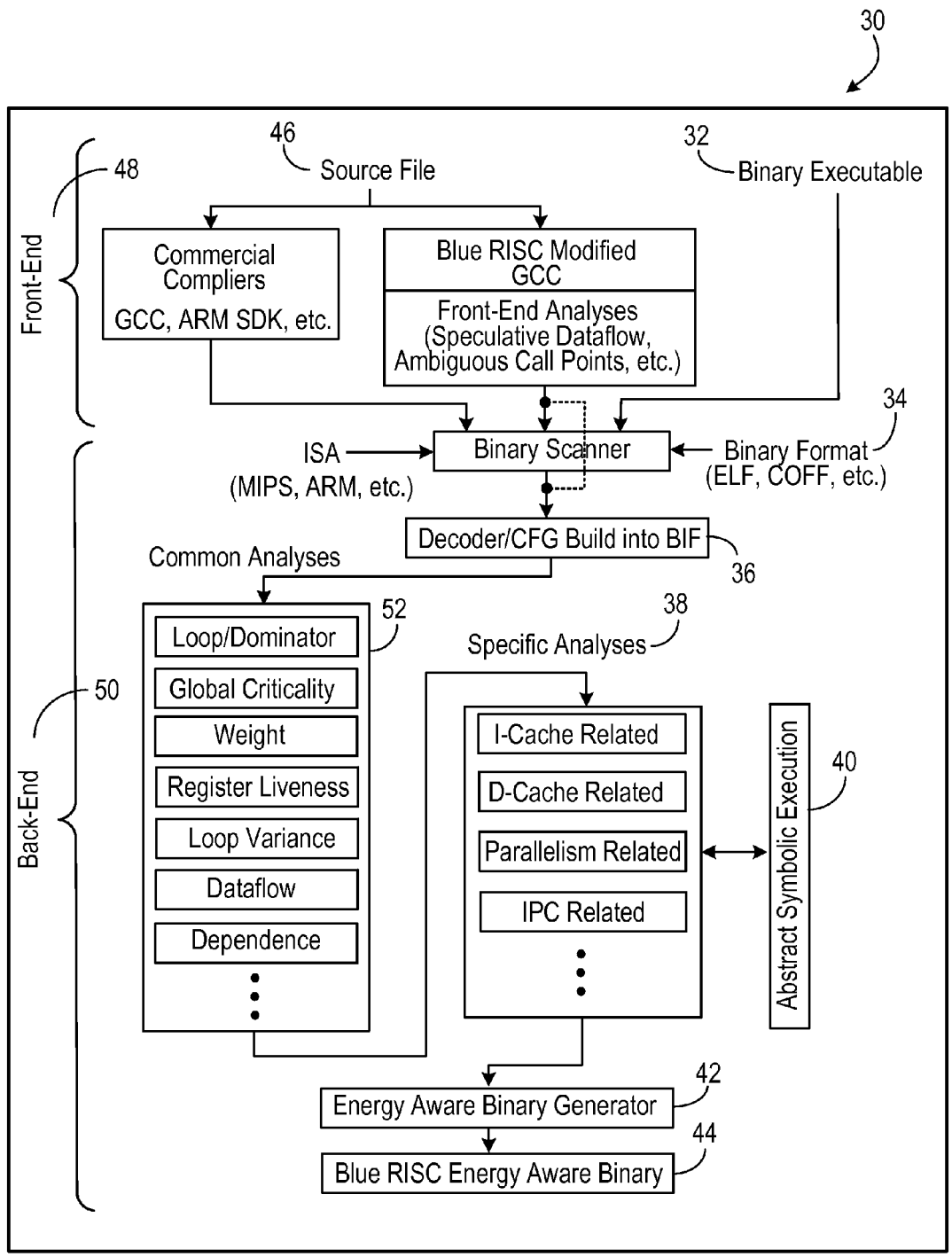
FIG. 3 is a flowchart showing a possible embodiment of an executable-level re-compiler according to the present invention and possible interfacing with source-level compilers.

In a preferred embodiment, a module provides a simple interface for extracting program information from a program executable—refer to 34 in FIG. 3. Apart from the instructions and static data, section and symbolic information may also be extracted. This could be information that is available in an executable as part of the instruction stream or that is inserted during source-level compilation to facilitate optimizations at the time of executable-level compilation.

There are a handful of executable file formats used in the industry today, such as ELF, COFF and PECOFF. For example, ARM-ELF defines ARM-specific extensions to the ELF (Executable and Linking Format) standard. In a preferred embodiment, such a module would provide a common interface for accessing executable files in some of these different formats. In one embodiment of this invention, these extensions have been supported.

Disambiguating an Executable

In one embodiment of this invention the executable file is analyzed by a binary scanning tool in order to gain information about the various sections and any other symbolic information that may be available. This information is used in order to create a version of the program based on an energy-focused Binary Intermediate Format or BIF, shown as 36 in FIG. 3.

BIF is an abstract representation that facilitates easy retargetability of the analysis and transformation techniques to different instruction sets. It provides necessary information organized in inter-related structures to help perform sophisticated program analyses and transformations.

Once program analyses and optimizations have been run, the optimized BIF object can be converted back into an executable of the same type as the original one or possibly another type with a different instruction set—see 42 in FIG. 3.

In general, the BIF object may be made up of many procedures or similar program constructs. These procedures may contain a graph of basic blocks or super-blocks, their edges denoting the control flow of the program.

The basic blocks contain the instructions that are executed in the application. Various information, such as registers, immediates, instruction type, addressing types, condition flags, energy-efficient execution/strength related conditions, etc., may be included about each instruction.

Once the BIF object has been created, the generated Control Flow Graph (CFG) of the program is subject to many different types of analyses to collect further static program information, shown as 52 in FIG. 3. During later analysis, other types of representations may be constructed to enable for example detection of program dependencies and ease program transformations. These representations might include dependence trees, dominator trees, and representations that enable removal of false dependencies, e.g., single state assignment form.

One of the initial analyses may be the loop analysis. This analysis may use a dominator algorithm to find all of the natural loops in the program. Additionally, induction variables, loop footers, step functions, loop-carried dependencies, early exit points, and memory access stride patterns may be identified and the BIF object updated with that information.

The idea of criticality may now be introduced. Criticality is used to estimate which of the program blocks are more critical to optimize. For example, blocks in loops are often more critical than blocks outside loops. In one embodiment, blocks in loops are assigned an initial local criticality and a global weight for example based on the depth of the loop they exist in, the procedure context in which they might be used, their probability of being run based on static branch prediction, their contribution to overall energy consumption, and additional heuristics.

With all of the local criticalities set, a global pass may be run to create a final global criticality value for each of the basic blocks in the program. The blocks in the procedures are updated on the basis of the criticalities of the blocks that call their respective procedures. Once this global criticality is set, a weight analysis may be run. This analysis assigns blocks in a program a global weight.

In one embodiment, weight may be based on the procedure it is in and its static probability of the block being run, assuming a start point at the beginning of its procedure.

After a BIF object is created that contains disambiguated symbolic information and the CFG, other analyses are run. FIG. 3 shows general analyses 52 which may be run on a BIF object before power-specific analyses 38 are run. Along with the specific analyses, the ability to use abstract symbolic execution 40 also exists.

Abstract execution may be used during various disambiguation phases. It may be used, but not limited to, in forward mode as a fast functional simulation kernel, or as a back-tracking tool on the CFG to disambiguate ambiguous program structures such as call points and branches that have register operands.

Referring to FIG. 3, the executable re-compiler 30 can be integrated with various source-level compilers in the front-end 48 that have source files 46 as inputs. The output of the front-end system is in various binary executable formats, such as used in input 32. The backend system 50 is responsible for transforming the executable input into an energy-aware binary 44 through a number of analysis and transformation passes.

Energy-Efficient Modifications Requiring No Architecture Support

In general, the framework could be used without requiring any modifications in a processor hardware.

In one embodiment, after a BIF object is created that may contain some or all of the disambiguated symbolic information and the CFG, energy-related analyses may be run. Along with the specific analyses, the ability to use abstract symbolic execution, for example, to determine data memory access patterns, can exist.

In one aspect, these analyses may include local and global analyses to perform instruction scheduling. In one aspect, the blocks that have been determined as consuming more energy, during criticality analyses, may be optimized in favor of blocks that are determined as less critical. As such, energy consumption may be increased on blocks that are determined as less critical or such blocks may not be targeted at all. Such increase in fact is to reduce the consumption elsewhere in blocks that are more critical to overall energy consumption.

Energy-focused instruction scheduling aims to arrange instructions or modify sequences of instructions to reduce energy. This could include rearranging instructions such that pipeline bubbles between dependent instructions are removed, such that instructions with lower energy/power consumption are used whenever possible, and such that architecture support that is present in a processor and that could reduce energy consumption can be better utilized.

In one embodiment, an example of such existing architecture support includes tag reduction techniques, such as used for example in an ARM 10 processor, where tag access can be removed to save energy whenever the instruction or data access is found in the same cache line as the previous memory access. Instruction scheduling may optimize for such scenarios.

Additional techniques can take into consideration branch folding scenarios to remove branching related overhead. Branch folding is a mechanism that requires folding the condition of a branch into a following instruction and removing the branch from the processor pipeline. If the branch is predicted correctly, typically determined when the following instruction reaches the execute stage, the branch effectively takes zero cycles to execute.

Other techniques group memory accesses together from several iterations to utilize more energy-efficient load-store multiple operations instead of individual loads and stores, such as present in some instruction sets.

Additional techniques may include energy-focused software pipelining and loop transformations. Such techniques can be applied to remove pipeline bubbles between dependent instructions with issue-distances larger than one cycle.

In such analyses, critical loop iterations may be transformed such that instructions from various loop iterations are pipelined or interleaved to reduce energy and/or improve performance. Loop iterations could be rearranged in a manner that reduces energy. False dependencies might be removed both within and across iterations. This can be accomplished with software register renaming, occasional loop-unrolling, hyperblock formation to eliminate non-critical control-flow, and other techniques. These techniques may be followed by a register allocation pass.

In one aspect, such transformations may be combined with an energy-focused global instruction scheduling, that involves code motion, to further reduce energy consumption on blocks that are on critical paths.

A global instruction scheduling rearranges instruction order such that estimated total energy consumption is reduced. It may increase energy consumption on non-critical paths in order to reduce energy on critical execution paths.

In one embodiment of the executable-level compilation for energy efficiency that has been implemented, targeting a leading 32-bit embedded microprocessor design from ARM, significant energy reduction could be achieved without requiring added architecture support. This reduction has been noticed for a wide range of important applications including video, audio, graphics, security, office automation, compressions and decompression.

Energy Optimizations Using Architecture Support

A number of analyses and optimizations could be performed targeting reduction of energy consumption based on dedicated architectural support that can be added to a processor.

In one aspect this may include, but it is not limited to, techniques that leverage statically managed energy-efficient hardware. Next, we present a number of such mechanisms. The framework is however not limited to only those that are described here. The compiler support can be implemented either through source-level or with executable-level re-compilation. The approach is not limited to using executable compilation.

On-Demand Static Issue (OSI) Processing and its Control

In one embodiment, energy consumption may be reduced by determining at compile time which instructions can be executed in parallel, without requiring special hardware disambiguation techniques, and adding at compile-time control information into the instruction stream ahead of their execution. In one aspect, such an approach can be integrated with other energy optimizations, resulting in the control overhead being amortized across many different, for example energy-related, optimizations in a processor.

In a superscalar processor design, parallelism extraction and scheduling is performed with hardware techniques; while superscalars can provide good improvement in performance, such designs are energy inefficient due to the runtime hardware support required to find and control parallel execution. Such hardware support is required, for example, to extract parallelism from instructions, hardware renaming, and reordering of instructions. Embedded processor manufacturers are reluctant to add parallelism via such an approach to their designs. This is because the increased complexity of the added hardware offsets the benefits of improved performance, due to the increase in load capacitances that increase power consumption.

By contrast, the parallelism method and processing system that is provided in this invention is on-demand and controlled fully statically. It is referred to as on-demand static issue (OSI) parallelism in the remaining text.

In comparison with compiler-managed techniques such as VLIW (Very Large Instruction Word) architectures, the OSI technique could be used selectively in code sequences where there is significant instruction-level parallelism and where the overall energy efficiency is estimated to improve, and not applied in codes where there is little parallelism and thus no energy benefit at runtime. As the parallelism is encoded for several instructions ahead of their execution, when parallelism is not exploited, the corresponding execution units can be put instead on standby. A key reason OSI is highly energy-efficient is because it has a minimal impact on the hardware. Moreover, when there is no parallelism in the program, the approach does not impact on the processors energy efficiency. The OSI method is selectively used to achieve as much energy reduction as possible.

The OSI solution does not affect significantly load capacitances in processor pipelines, as most of the support required is in the compiler where no runtime-related energy is consumed. The required hardware support could include added read and write ports on the register file and the ability to decode and fetch multiple instructions per cycle.

OSI does not require a fixed multi-issue instruction format similar to a VLIW design. In fact, a processor that supports OSI is backward compatible with codes that do not expose OSI parallelism: another key practical benefit.

The control bits required for OSI depend on the level of parallelism targeted, but could be as few as one bit per group of instructions specified to be issued in parallel. In a 2-way OSI embodiment it would be sufficient to add one bit per group, or three bits in a six-instruction long basic block. Other types of encodings are however also possible.

In a preferred embodiment of the invention, the control bits required by OSI could be combined with control bits required for other optimizations.

The control can be encapsulated for an instruction sequence such as a basic block or super block. This way, static control overhead due to the code dilution is optimized across many other, for example energy related, beneficial optimizations.

The OSI parallelism approach would also be applicable to existing processor designs as it can be an add-on component. A processor that would be equipped with such a feature would be backward compatible with compilers that do not expose parallelism at compile time; that is, previously compiled executables could also be run unmodified on such a processor. This feature makes OSI an easy upgrade on simple embedded designs where backward compatibility is often required to be preserved due to market constraints.

In one possible embodiment that we present next, the OSI-related compile-time parallelism analysis is broken up into three different schemes. The first scheme finds the parallelism that is already present in a basic block. The second global scheme reschedules the instructions in several basic blocks globally, to bring out more parallelism. A third approach, is based on a basic block and hyperblock-level software-pipelining technique to expose more parallelism in critical loops. Codes that have extensive control-flow and complicated do-across loop-structure, such as having early exit points and loop-carried dependencies, can also be handled.

The first, simplest, parallelism scheme traverses the program, performing the analysis on each block that has already been annotated as a critical block. Once a critical block is found, the analysis starts with the first two instructions, in a 2-way OSI embodiment. The two instructions are first checked to see if they could possibly run in parallel given the restrictions of the second OSI pipeline. The types of operations supported in the second pipeline are implementation or embodiment specific.

For simplicity of describing the techniques we assume 2-way OSI pipelines, however, this is not a limitation—any number of additional execution units and with various capabilities can be added, depending on application and vertical markets targeted.

The checks that are made for the second pipeline in a possible embodiment are as follows. In one of its aspects, instructions cannot be run in parallel only if: the first instruction is not conditional and the second instruction is (the status bits could be affected); either of the instructions contain the Program Counter; either of the instructions are branch instructions; neither of the instructions is of type Data Processing; both instructions are multiply instructions; one instruction is a multiply and the other is not a data processing instruction.

These checks reflect a design where the second OSI pipeline only has limited capabilities to execute certain type of arithmetic a logical instructions. This is not a limitation: it is the choice of the designer to decide what capabilities to have in each pipeline, or how many pipelines to add.

There are also special instructions in different architectures that might not be run in parallel (e.g., saturated add/sub in ARM (QADD, QSUB), state changing instructions in ARM (MSR, MRS)).

If the instructions can be run in parallel, given the hardware constraints, they are then checked for inter-n instruction dependencies. This dependency analysis starts by checking the second instruction for dependencies on the first instruction. Read-After-Write (RAW) hazards as well as Write-After-Write (WAW or output) and Write-After-Read (WAR or false) hazards are dependencies that typically prevent the instructions from being run in parallel. Software register-renaming techniques in the compiler can be used to eliminate both inter- and intra-iterations-based output and false dependencies.

If the pair of instructions passes both the pipeline restrictions and the dependency tests, there is one final check that can be made. This is another dependency check, only this time, the next instruction in the basic block, i.e., the 3rd instruction in this example, is checked for dependencies with the first. This check is made because if there is a dependency between the first and the third, there might not always be a speedup if the first and second were run in parallel. If all checks are passed, the first and second instructions are annotated to be run in parallel and at code generation, the necessary control bits are inserted into the control instructions.

This process is repeated until all the instructions in the basic block have been analyzed with their following instruction.

A second scheme for OSI parallelism, instead of taking the instructions in the order the original performance compiler put them, it reschedules the instructions in a manner to bring out more parallelism. This scheme can be complemented with a third approach based on a software pipelining, to expose more parallelism in loops. There are many other ways parallelism can be exposed and the embodiment described here is not intended to be limiting.

The OSI instruction rescheduling pass builds a dependency graph for the instructions in the basic block. Along with this dependency graph, each instruction is checked against all of the following instructions and noted whether or not it could be run in parallel with them. Once this is complete, a modified scheduling algorithm is used to reschedule the instructions.

The rescheduling algorithm used starts with the instructions that have no incoming edges (instructions that don't depend on any other instructions). If there is more than one instruction in this group of candidates, the instruction with the earliest original place in the basic block is chosen to be scheduled. After an instruction is scheduled, all of the outgoing edges (instructions that depend on the instruction that was scheduled last) are possible candidates. These possible candidates are only deemed candidates if all of their incoming edges have already been scheduled.

If there is more than one instruction that could be run in parallel with the previously scheduled instruction, the instruction with the earliest original placement is selected.

There is an additional step that may be necessary in instruction sets that support conditional execution. To ensure correctness, the instruction that alters the status bits, which the conditionally executed instructions depend on, is always scheduled as late as possible. This ensures that the conditionally executed instructions that follow will have the correct status bits set. This ensures that the conditionally executed instructions that follow will have the correct status bits set.

Compiler-Inserted Control to Reduce Energy in the Instruction Memory

This part of the invention relates to compiler-architecture interaction based approach to reduce energy consumption in the instruction memory system.

An optimization may target reduction of energy in the instruction memory by directing instruction memory accesses to other more energy-efficient memory structures than the conventional memory structures.

This control can be incorporated by adding one or more static control bits per controlled sequences of instructions. In fact, a scheme that uses one bit per controlled sequence is possible.

Figure 4:
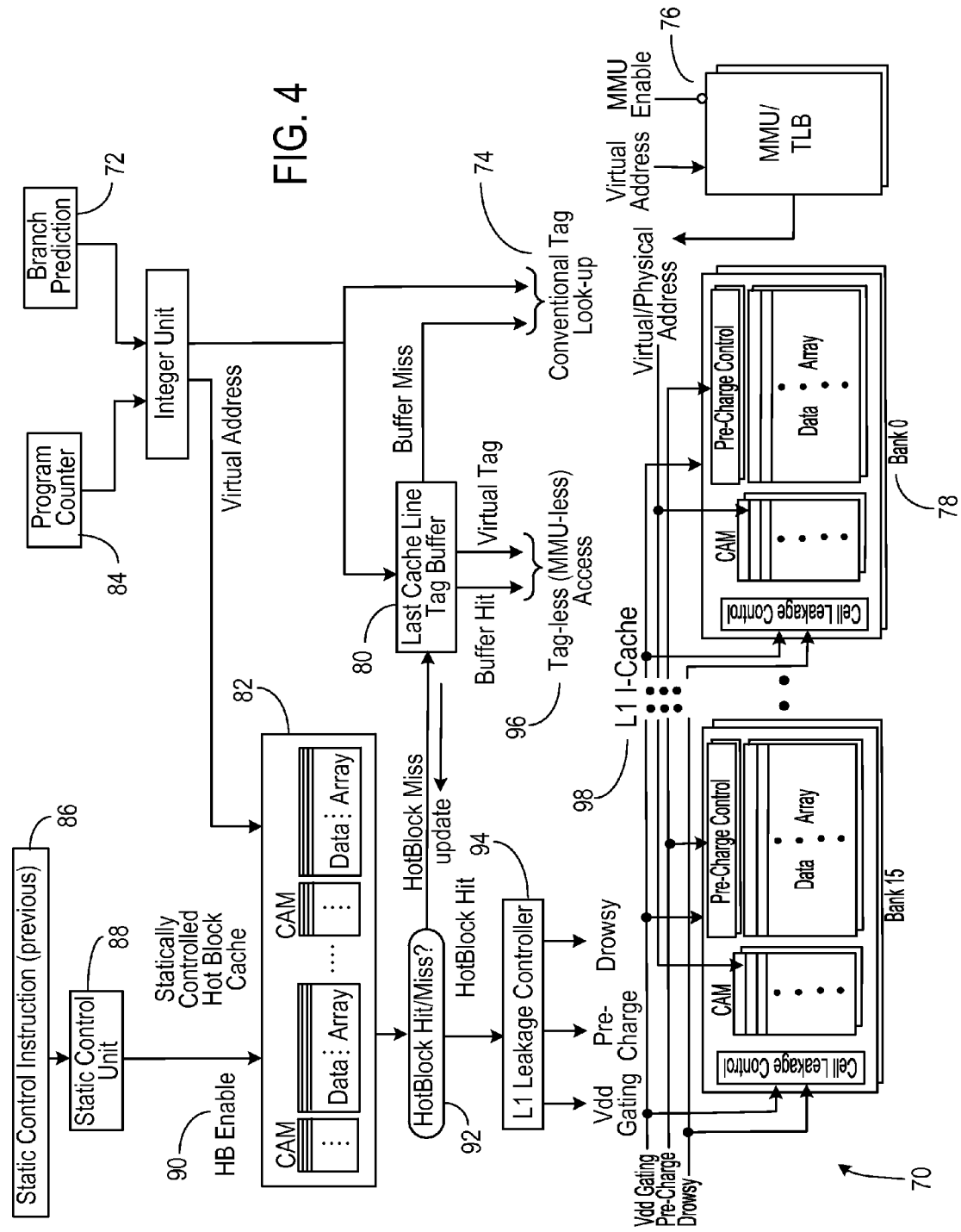
FIG. 4 is a block diagram of an instruction memory system that contains the added extensions for Hotblock access to achieve energy reductions based on compiler-architecture interaction and selective mapping between the L1 I-Cache and the Hotblock cache.

In one embodiment, shown in FIG. 4, there are two memory structures used in the memory architecture—both are compiler controlled. A first structure is a small cache or an SRAM memory or a partition of the first level cache, called the Hotblock 82; a second structure is equivalent to a conventional first level cache 98, and requires either a conventional lookup 74 or could avoid tag-lookup 74 if it is accessing data in the same cache line as in the previous access, shown as mechanism 80 and 96. In a different embodiment the first level cache could be a Ram-Tag based cache instead of the CAM-tag based shown in the figure. A key difference between the two cache types is that in a CAM-based design the tag-check is performed with a Content Addressable Memory (CAM) structure where tags in each way in a set are compared within the CAM after which the correct word-line is selected if the operation results in a cache hit. By contrast, the Ram-based tag structure would require indexing that is performed after word-line decoding from the input address bits. This indexing is performed typically in parallel for the data-array and tag-array.

Another embodiment may have multiple levels of caches and the addressing of the caches may be physical or virtual.

In one aspect, the compiler selects to map sequences of instructions, such as a basic block, to either of these structures. When a compiler maps sequences of instructions to the smaller Hotblock structure 82, enabling signal 90, instruction memory related energy consumption can be significantly reduced due to the reduction of access energy. This reduction is achieved because the Hotblock cache has a much smaller access energy compared to the first level cache. Clearly, the more accesses are mapped to the Hotblock cache correctly, that is, without causing a Hotblock cache miss, the greater the improvement in energy efficiency.

Moreover, cell and bitline related leakage energy could be reduced in the first level instruction cache during a Hotblock access by providing support for putting L1 cache lines that are mapped to the Hotblock cache into low-leakage modes.

The benefit of a compiler-driven strategy for leakage reduction is that it would allow controlling tradeoffs between awakening energy/delay, performance degradation, and leakage power reduction, at a fine granularity and without impacting hardware complexity significantly.

Inactivity periods are program dependent, as resource demands change as execution proceeds. When inactivity periods are longer and highly predictable at compile-time, we could select to put the circuit blocks in lowest possible leakage power modes. When the inactivity periods are unknown or speculative, we could instead select to use state-preserving approaches (or no leakage control) that, while saving less energy, have lower awakening costs in case of (inactivity period) mispredictions.

Low leakage modes can be based on gating the power supply 94 on cache lines and/or reduced power supply on cache lines, also called drowsy lines, controlled in block 94. Other schemes are also possible; the compiler control can be adapted to various circuit-level implementations to address leakage in SRAM cells, as well as control precharging to reduce leakage in the bitlines. Precharging-related leakage energy can be avoided by precharging only the first level cache bank that contains the memory access, instead of all the banks.

The actual leakage power savings depend on the fraction of drowsy cells compared to gated cells in the L1 data array and other factors such as the time periods during which we can maintain low leakage states in L1 cache lines. The leakage power in the Hotblock cache is small given its small size, as leakage power is at first order proportional to the size of the circuit. Another mechanism used, controls cell and bitline leakage during L1 accesses.

Bitline leakage is reduced by precharging only the right cache bank whenever the compiler (or the last cache line tag buffer 80) guarantees intra-line cache accesses. Furthermore, instructions that are placed into low leakage modes during previous Hotblock accesses, would remain in low leakage modes until accessed again.

With careful compiler orchestration of only mapping the energy critical sequences to the Hotblock structure and reusing the Hotblock across critical loops, a very small cache size can be used. In this embodiment, a cache of 1 Kbyte size provided a sufficient storage for optimizing a wide range of applications studied.

Independent of the Hotblock cache size, the compiler can restrict accesses to achieve a very high Hotblock hit rate.

If the Hotblock cache integrates protection related to virtual memory, then address translation from virtual to physical, can be avoided by enabling signal 76.

The method in this invention can keep the Hotblock miss rate 92 very low by mapping selectively critical sequences of instructions, estimating the required memory footprint, and managing it at fine granularity with control bits inserted into the instruction stream at fine granularities.

Furthermore, the control can be integrated with other energy optimizations based similarly on compiler-architecture interaction: any overhead from static control could be therefore amortized across several energy optimization. The negative effects of the control, if any, are more than compensated for by the energy reductions obtained in several critical processor components.

In the embodiment evaluated we have found that the compiler could limit the miss rate in such a Hotblock structure to below 1%. In one embodiment, this has been demonstrated for a structure as small as 1 KByte size and for a wide range of applications, including SPEC2000, Media, and Mibench benchmarks. These benchmarks represent a cross-section of typical embedded applications from many industries including telecom, security, media, and automotive.

This can be attributed to selecting at compile time only the very critical blocks and by guaranteeing at compile time that thrashing in the Hotblock structure during critical program sequences such as critical loop iterations do not occur.

The architecture used can be fully flexible in the way the various structures are ordered. In one preferred embodiment the first level cache 98 can also be accessed directly, depending on compiler information, and it can also be accessed on a miss 94 in the Hotblock structure.

The compiler would map selected critical blocks, at a fine granularity, to the Hotblock structure and less critical blocks directly to the first level cache.

In this embodiment, a Hotblock miss is looked up in the first level cache. If the entry is found in the first level cache the corresponding entry in the Hotblock structure is updated.

A hotblock miss results in a one-cycle penalty. However, with compiler control, the miss rate can be kept very low. Non-critical instructions are directly fetched from the first-level cache avoiding Hotblock misses. The Hotblock cache is reused across instruction sequences such as different loop structures.

In general, compiler control decides which one of the memory structures is accessed and for which selected instruction sequences, such that overall energy consumption is optimized. The compiler analysis ranks all basic blocks, or larger blocks, in terms of their estimated contribution to the processor's total energy consumption, to determine the memory structure used.

Figure 5A:
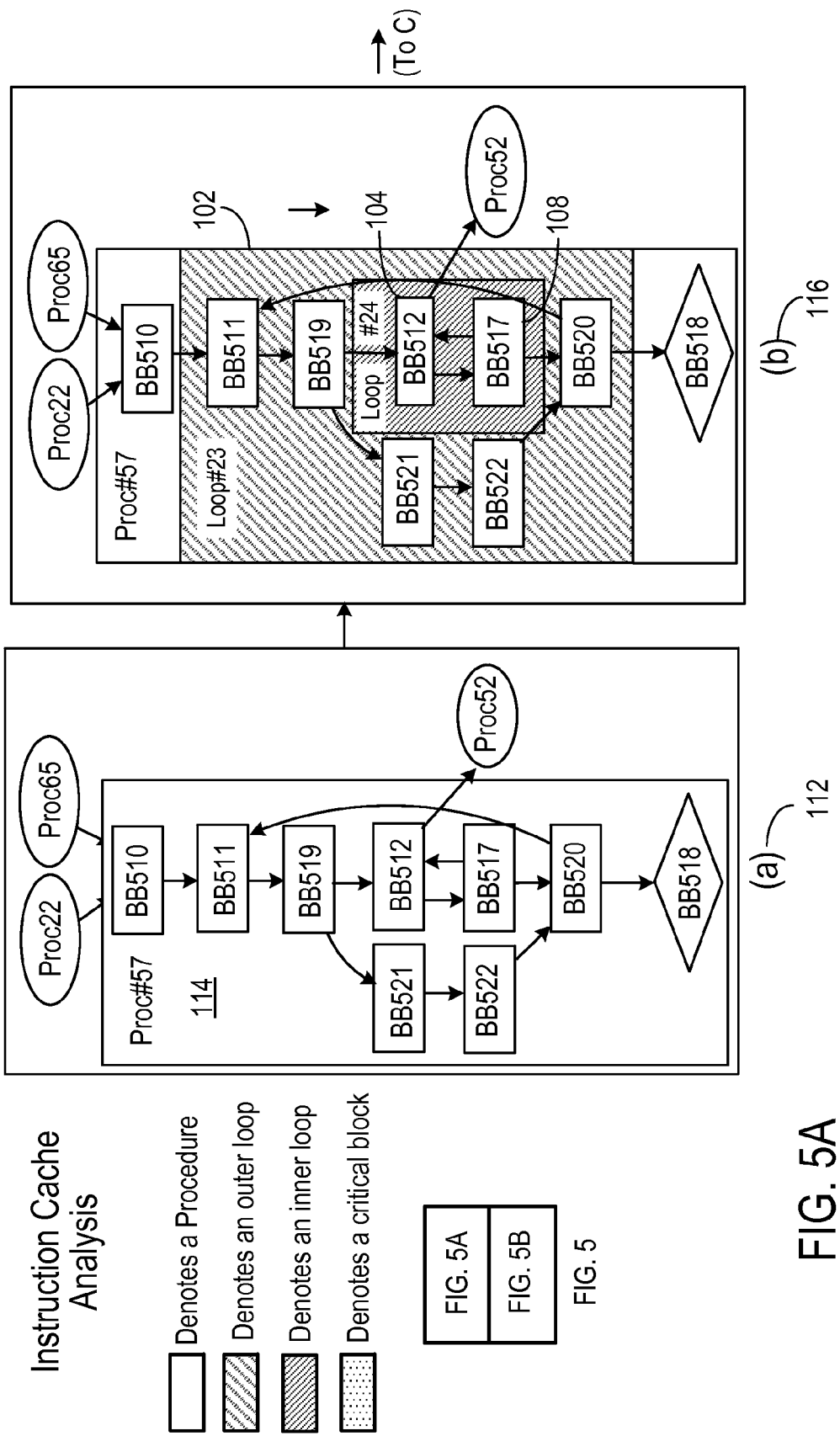
FIG. 5, comprised of FIG. 5A and FIG. 5B, is a flowchart showing an example of a procedure as seen and analyzed by the compiler, in one embodiment, to achieve energy reduction in the instruction memory system.
Figure 5B:
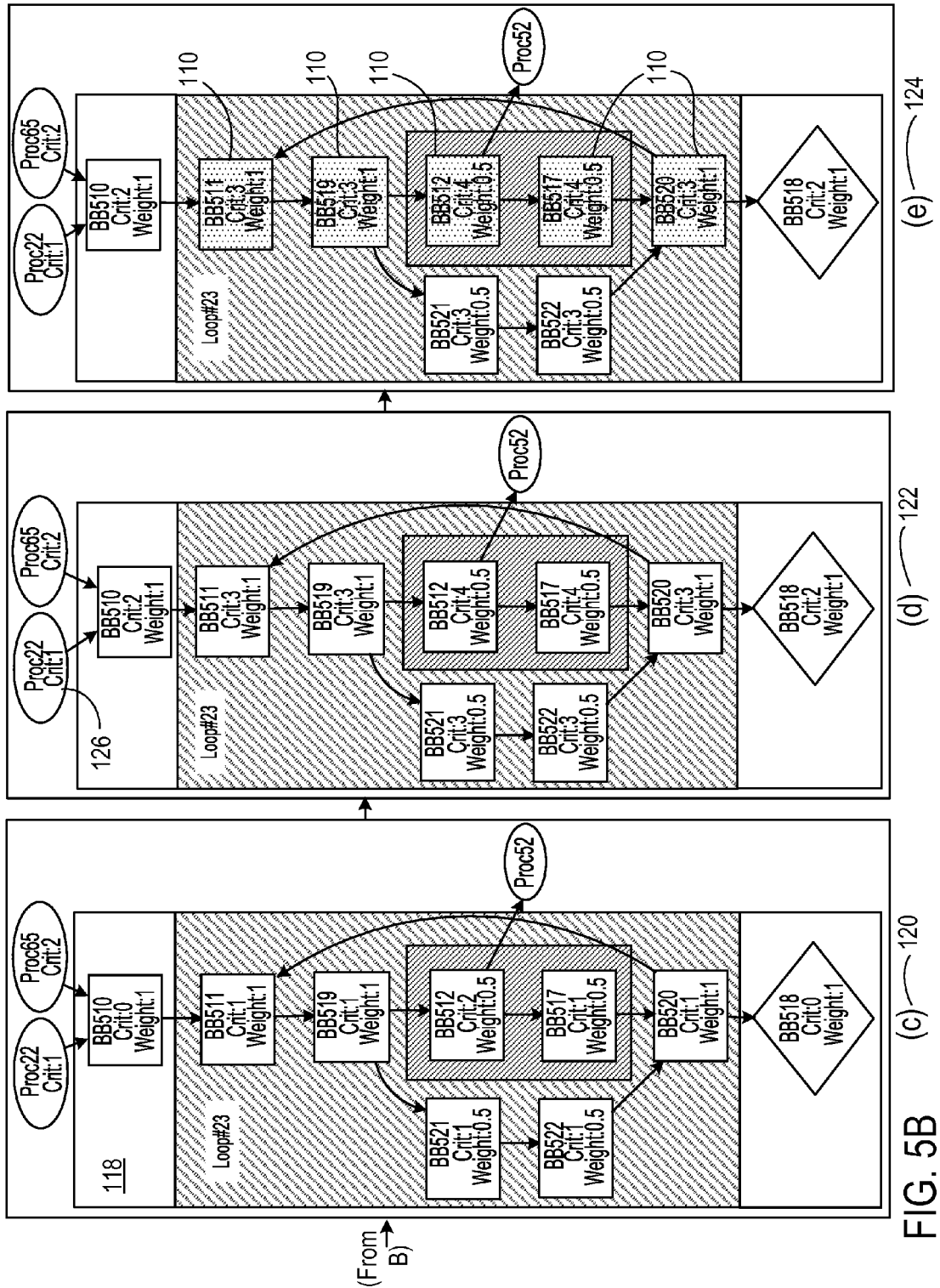

Referring to FIG. 5, key steps of an instruction analysis 100 are shown on a procedure called Proc 57. Flowchart 112 denotes a CFG with basic blocks including flowchart 114 that denotes Proc 57. The next flowchart 116 shows basic blocks with detected loop structures including outer-loop 102 and inner-loop 104 and loop-footer 108 for inner-loop. The outer-loop is also shown in flowchart 120 as 118. As shown, the outer-loop encapsulates the inner-loop. During analysis in flowchart 120, weight and loop-related criticality is calculated for each basic block. Weight is recalculated after each branch. Depending on embodiment, a weight is attributed depending on the position of the block in the CFG. Criticality in the procedure is added based on loop nest information extracted during analysis on Flowchart 116. Flowchart 122 shows all blocks updated with weight and criticality by also taking into consideration incoming procedure criticalities such as due to procedure 126 that has an incoming edge to procedure 57. After this global criticality analysis, the most critical basic blocks 110 are determined as shown in flowchart 124. These are the blocks that are ultimately mapped to the Hotblock cache. If their footprint exceeds the available space, for example due to fragmentation in the cache, the blocks are mapped in order of their criticality. Fragmentation and other aspects such as cache line size and cache associativity can be taken into consideration during the mapping to avoid overflowing the available space in the Hotblock cache and causing unwanted cache misses. This analysis shows an example with one Hotblock cache. Other embodiments can be based on several Hotblock caches and of different sizes. In such cases, the analysis would map the most critical blocks starting from the smallest Hotblock cache and so on. This organization is not intended to be limiting. Any hierarchical organization of memory structures can be mapped to blocks in the same fashion based on a compiler-selected criticality (or optimization) criterion.

Other Compiler-Inserted Control for Energy Reduction

Furthermore, data memory accesses could be directed similarly to more energy efficient access mechanisms to avoid tag-lookups and associative data-array accesses, or to access more energy-efficient memory structures such as a smaller cache or a small cache partition. This may include determining the memory access strides or the criticality of an instruction in an instruction stream. Control information could be added, encoding such sequences of instructions, to enable streamlining a data memory access.

Unnecessary register file accesses can be avoided by exposing the register access to the compiler and by avoiding register access for registers that are short-lived by accessing the value directly from added buffers in a design, such as accumulators and bypass latches.

In one aspect, the approach enables replacing dynamic bypass networks in processors, with compiler controlled explicit bypassing.

In general, in one aspect, dynamic branch prediction techniques could be complemented or replaced by energy-focused static branch prediction. Additionally, compiler-managed prefetching or prefetching hints could be incorporated to reduce cache related energy consumption in designs that otherwise aggressively use prefetching.

Encapsulating Compiler Inserted Control for Several Optimizations

All these mentioned optimizations and others not described in this embodiment could be integrated into a processor-wide solution and controlled with one or more control instructions per sequence of instructions. This would reduce the control overhead as the code-dilution overhead would be amortized across many different energy optimizations.

In one aspect, the control bits could be added as data to an executable. In one aspect, this data can be accessed through a small dedicated hardware mechanism that would associate branch targets to addresses where control bits are located in the data memory, for example through a hashing mechanism, to fetch the corresponding control bits. A static decode unit would decode these bits and generate the control signals for the associated sequence of instructions.

During execution, a sequencing mechanism would control both processor resources and select appropriate energy efficient access mechanisms corresponding to the encodings decoded from the compiler-generated control bits.

The control information can also be incorporated as regular extensions to the instruction set or as co-processor instructions.

Minimal added pre-decoding logic could be used to remove the control instructions before entering processor pipelines.

Transformations to the Binary and Relocation of Executable

Modifications performed on the executable may require relocation of procedure call addresses and memory operations as well as code and other sequences in an executable.

A method in this invention provides such a relocation in a performance-efficient way in case ambiguous branches or memory accesses exist in the executable. Ambiguous branches or memory accesses may refer to situations when addresses are not known at compile time.

The challenge is that ambiguous call-points may refer to any procedure in the program; thus if the start point of a procedure is changed in the executable the ambiguous call point may execute incorrectly after relocation is performed.

In one embodiment, a solution is provided based on the observation that if the original program addresses in the executable of these ambiguous instructions are kept unmodified and all procedures entry points are kept unmodified after relocation, the relocation can be easily accomplished. This can be achieved easily by moving some portion of a procedure to the end of the executable.

A sample implementation, including the optimizations outlined and performed at executable-level, achieves energy reduction of 26% to 68% when implemented to extend a leading embedded low-power processor.

Other Embodiments

The invention is not limited to the specific embodiments described herein. The invention is not limited to reducing energy consumption. It could also be used, but is not limited to, to improve performance or improve security.

Other types of compiler analyses and/or architecture support may be used. The invention may be applied to control any appropriate component of a processor. The optimizations and/or analyses may be performed in a different order and combined with other techniques, in other embodiments. There are different forms of energy consumption, for example such as dynamic or leakage power. The invention is not limited to one source of energy consumption; compiler control for both leakage and dynamic energy can be accomplished as described.

Other embodiments not described herein are also within the scope of the following claims.

What is claimed is:

1. A method, comprising:
   inputting source files into a source-level compiler to obtain a binary executable;
   analyzing a representation of the binary executable to identify information relating to micro-operations of components of a microprocessor;
   responsive to analyzing the representation of the binary executable to identify the information relating to the micro-operations of the components of the microprocessor, generating control information comprising instructions that contain data that renders unnecessary at least one of the micro-operations;
   transforming the representation of the binary executable obtained from the source-level compiler into a binary executable that is different than the binary executable obtained from the source-level compiler, the transformation including combining the generated control information with at least one of instructions of the representation of the binary executable; and
   predicting inactive periods of resources in the microprocessor using static information produced through a compilation of a computer program;
   wherein the control information is configured to:
      control the resources during the inactive periods so as to reduce energy consumption of the resources during the inactive periods;
      reduce an amount of voltage supplied to the resources during the inactive periods relative to an amount of voltage supplied to the resources during active periods of the resources; and
      precharge a cache of the resources to reduce leakage in bitlines associated with the cache.

2. The method of claim 1, wherein transforming the representation of the binary executable comprises removing a branched instruction from the instructions of the representation of the binary executable.

3. The method of claim 1, further comprising:
   generating the representation of the binary executable by replacing a first instruction sequence corresponding to the binary executable obtained from the source-level compiler with a second instruction sequence that is different than the first instruction sequence.

4. The method of claim 3, wherein the representation of the binary executable comprises program blocks, wherein analyzing the representation of the binary executable comprises identifying a subset of the program blocks associated with a specific criticality, and the method further comprises:
   generating the second instruction sequence responsive to identifying the subset of the program blocks associated with the specific criticality.

5. The method of claim 1, wherein transforming the representation of the binary executable further comprises rearranging the instructions of the representation of the binary executable.

6. The method of claim 5, wherein rearranging the instructions of the representation of the binary executable obtained from the source-level compiler further comprises reordering the instructions of the representation of the binary executable obtained from the source-level compiler to increase an amount of parallel instructions.

7. The method of claim 1, wherein analyzing the representation of the binary executable comprises identifying instructions that may be executed in parallel, and wherein the control information identifies instructions in the binary executable obtained responsive to the transformation that may be executed in parallel.

8. The method of claim 7, wherein the control information comprises a control bit preceding the instructions in the binary executable obtained responsive to the transformation that may be executed in parallel.

9. The method of claim 7, wherein identifying instructions that may be executed in parallel further comprises identifying parallel instructions in blocks of instructions associated with the binary executable obtained from the source-level compiler.

10. The method of claim 7, wherein identifying instructions that may be executed in parallel further comprises exposing parallel instructions in critical loops in the binary executable obtained from the source-level compiler.

11. The method of claim 7, wherein the control information comprises data to be removed from an instruction sequence of the binary executable obtained responsive to the transformation before a corresponding portion of the instruction sequence enters a pipeline of the microprocessor.

12. The method of claim 7, wherein the control information is usable during executing of the binary executable obtained responsive to the transformation to improve operation of the microprocessor relative to execution of the binary executable obtained from the source-level compiler.

13. The method of claim 12, wherein the control information is usable to reduce energy consumption of the microprocessor during execution of the binary executable obtained responsive to the transformation.

14. A memory device having instructions stored thereon that, in response to execution by a processing device, cause the processing device to perform operations comprising:
  analyzing a representation of a first binary executable to identify information relating to micro-operations of components of a microprocessor;
  responsive to analyzing the representation of the first binary executable to identify the information relating to the micro-operations of the components of the microprocessor, generating control information comprising instructions that contain data that renders unnecessary at least one of the micro-operations;
  transforming the representation of the first binary executable into a second binary executable that is different than the first binary executable, the transformation including combining the generated control information with at least one of instructions of the representation of the first binary executable; and
  predicting inactive periods of resources in the microprocessor using static information produced through a compilation of a computer program;
  wherein the control information is configured to:
    control the resources during the inactive periods so as to reduce energy consumption of the resources during the inactive periods;
    reduce an amount of voltage supplied to the resources during the inactive periods relative to an amount of voltage supplied to the resources during active periods of the resources; and
    precharge a cache of the resources to reduce leakage in bitlines associated with the cache.

15. The memory device of claim 14, wherein transforming the representation of the first binary executable further comprises rearranging the instructions of the representation of the first binary executable.

16. The memory device of claim 14, wherein transforming the representation of the first binary executable comprises removing a branched instruction from the instructions of the representation of the first binary executable.

17. The memory device of claim 14, wherein the cache comprises first and second memory structures, the first memory structure being smaller than the second memory structure; and
  wherein precharging is to be performed on the second memory structure but not on the first memory structure.

18. The memory device of claim 14, wherein the cache comprises first and second memory structures, the first memory structure being smaller than the second memory structure;
  wherein the static information identifies instructions in the computer program, the instructions in the computer program having instruction footprints that can be accommodated by the first memory structure;
  wherein the first memory structure is used for the instructions in the computer program; and
  wherein the control information is configured to reduce voltage to the second memory structure during execution of the instructions in the computer program.

19. The memory device of claim 14, wherein the operations further comprise generating the representation of the first binary executable by replacing a first instruction sequence corresponding to the first binary executable with a second instruction sequence that is different than the first instruction sequence.

20. The memory device of claim 19, wherein the representation of the binary first executable comprises program blocks, wherein analyzing the representation of the first binary executable comprises identifying a subset of the program blocks associated with a specific criticality, and the operations further comprise:
  generating the second instruction sequence responsive to identifying the subset of the program blocks associated with the specific criticality.

* * * * *